United States Patent

Uchiyama et al.

[11] Patent Number: 6,058,340
[45] Date of Patent: May 2, 2000

[54] SUSPENSION CONTROL APPARATUS

[75] Inventors: Masaaki Uchiyama, Kanagawa-ken; Taro Uyama, Saitama-ken; Yoshiko Matsumura; Nobuyuki Ichimaru, both of Kanagawa-ken, all of Japan

[73] Assignee: Tokico Ltd., Kanagawa-ken, Japan

[21] Appl. No.: 08/361,554

[22] Filed: Dec. 22, 1994

[30] Foreign Application Priority Data

Dec. 28, 1993 [JP] Japan ................................. 5-353204

[51] Int. Cl.$^7$ ................................................ B60G 17/00
[52] U.S. Cl. ........................... 701/37; 701/38; 280/5.514
[58] Field of Search ..................... 364/424.05; 280/688, 280/703, 707, 840, 6.1, 6.11, 5.5, 5.502, 5.506, 5.509, 5.514; 188/378, 299; 701/37, 38, 39, 40

[56] References Cited

U.S. PATENT DOCUMENTS

| | | | |
|---|---|---|---|
| 4,422,322 | 12/1983 | Spangler | 73/105 |
| 4,579,366 | 4/1986 | Doi et al. | 280/707 |
| 4,749,210 | 6/1988 | Sugasawa | 280/707 |
| 4,827,416 | 5/1989 | Kawagote et al. | 364/424.05 |
| 4,872,701 | 10/1989 | Akatsu et al. | 280/703 |
| 4,934,731 | 6/1990 | Hinatashi et al. | 280/698 |
| 4,953,089 | 8/1990 | Wolfe | 364/424.05 |
| 5,033,770 | 7/1991 | Kamimura et al. | 280/707 |
| 5,037,128 | 8/1991 | Okuyama et al. | 280/703 |
| 5,071,159 | 12/1991 | Kamimura et al. | 280/707 |
| 5,289,380 | 2/1994 | Kimura | 364/424.05 |

FOREIGN PATENT DOCUMENTS

| | | |
|---|---|---|
| 3923929A1 | 1/1990 | Germany . |
| 3918735A1 | 12/1990 | Germany . |
| 4137712A1 | 5/1992 | Germany . |
| 4139692A1 | 6/1992 | Germany . |

Primary Examiner—Tan Nguyen
Attorney, Agent, or Firm—Wenderoth, Lind & Ponack, L.L.P.

[57] ABSTRACT

A suspension control apparatus includes a variable damping coefficient type shock absorber disposed between sprung mass and unsprung mass of a vehicle and an actuator for setting and adjusting a damping coefficient of the variable damping coefficient type shock absorber on the basis of a control signal. An upward and downward absolute velocity detector for detecting an upward absolute velocity and a downward absolute velocity of the vehicle is provided. A control unit changes a signal from the upward and downward absolute velocity detector in accordance with a running condition of the vehicle to obtain a control target signal. A control signal generator outputs the control signal for the actuator on the basis of the control target signal from the control unit. A signal representative of the roughness of a road surface on which the vehicle is running is generated and a feature of the control unit is adjusted for changing the control signal on the basis of the signal representative of the road surface roughness.

22 Claims, 26 Drawing Sheets

← CONTROL SIGNAL θ

SUSPENSION CONTROL APPARATUS

BACKGROUND OF THE INVENTION

1. Field of the Invention

The present invention relates to a suspension control apparatus.

2. Related Background Art

An example of a conventional suspension control apparatus is disclosed in Japanese Patent Laid-open No. 5-330325 (1993). Such a suspension control apparatus comprises a shock absorber of variable damping coefficient type disposed between sprung mass and unsprung mass of a vehicle, an actuator for setting and adjusting a damping coefficient of the shock absorber of variable damping coefficient type, an acceleration sensor for detecting an upward acceleration and a downward acceleration of the vehicle, an integration means for integrating a signal from the acceleration sensor to obtain an upward absolute velocity or a downward absolute velocity, a control target value calculating means for multiplying the upward or downward absolute velocity value by a control gain to obtain a control target value, and a control signal generating means for previously storing information representative of a relative relation (which is obtained on the basis of a feature of the shock absorber of variable damping coefficient type) between the control target value and a control signal and for generating a corresponding control signal by inputting the control target value from the control target value calculating means, whereby the damping coefficient corresponding to the upward or downward absolute velocity can be obtained to improve the comfort and steering ability of the vehicle.

By the way, theoretically, in order to suppress upward and downward vibrations of a vehicle, although it is desirable to adjust damping forces of the vehicle on the basis of the upward and downward absolute velocities of the vehicle, since a shock absorber cannot adjust the damping force directly (the damping force is a function of a piston speed multiplied by the damping coefficient), in effect, the damping coefficients are adjusted on the basis of the upward and downward absolute velocities, as is in the afore-mentioned conventional example.

Accordingly, in the afore-mentioned conventional example, the control gain/dead band is set by supposing an average or mean piston speed generated when the vehicle is running on a normal paved road surface (in this case, the vibration of the vehicle and the amplitude thereof are relatively small), and the vibration control is effected on the basis of the set value.

However, when the vehicle is running on a rough road surface (in this case, the vibration of the vehicle and the amplitude thereof are great), the actual piston speed becomes considerably greater than the average piston speed, with the result that a damping force greater than a desired damping force is generated, thereby worsening the comfort of the vehicle.

SUMMARY OF THE INVENTION

The present invention aims to eliminate the above-mentioned conventional drawback, and an object of the present invention is to provide a suspension control apparatus which can maintain good comfort of a vehicle regardless of road surface conditions.

To achieve the above object, the present invention provides a suspension control apparatus comprising a shock absorber of variable damping coefficient type disposed between sprung mass and unsprung mass of a vehicle, an actuator for setting and adjusting a damping coefficient of the shock absorber of variable damping coefficient type on the basis of a control signal, an upward and downward absolute velocity detection means for detecting an upward absolute velocity and a downward absolute velocity of the vehicle, a control target calculating means for multiplying the upward or downward absolute velocity by a control gain to obtain a control target signal, a control signal generating means for emitting the control signal for the actuator on the basis of the control target signal, a road surface condition judging means for judging whether a condition of a road surface on which the vehicle is running is bad or not, and a control gain adjusting means for adjusting the control gain to a smaller value when it is judged that the road surface condition is bad by means of the road surface condition judging means.

The present invention further provides a suspension control apparatus comprising a shock absorber of variable damping coefficient type disposed between sprung mass and unsprung mass of a vehicle, an-actuator for setting and adjusting a damping coefficient of the shock absorber of variable damping coefficient type on the basis of a control signal, an upward and downward absolute velocity detection means for detecting an upward absolute velocity and a downward absolute velocity of the vehicle, a correction value calculating means for correcting the upward or/and downward absolute velocity to a correction value by removing the upward or/and downward absolute velocity as a dead band if the upward or/and downward absolute velocity is smaller than a predetermined value, a control target calculating means for multiplying the correction value by a control gain to obtain a control target signal, a control signal generating means for emitting the control signal for the actuator on the basis of the control target signal, a road surface condition judging means for judging whether a condition of a road surface on which the vehicle is running is bad or not, and a dead band adjusting means for adjusting the predetermined value of the dead band to a greater value when it is judged that the road surface condition is bad by means of the road surface condition judging means.

The present invention still further provides a suspension control apparatus comprising a shock absorber of variable damping coefficient type disposed between sprung mass and unsprung mass of a vehicle, an actuator for setting and adjusting a damping coefficient of the shock absorber of variable damping coefficient type on the basis of a control signal, an upward and downward absolute velocity detection means for detecting an upward absolute velocity and a downward absolute velocity of the vehicle, a control target calculating means for multiplying the upward or downward absolute velocity by a control gain to obtain a control target signal, a control signal generating means for emitting the control signal for the actuator on the basis of the control target signal, an upward and downward relative velocity detection means for detecting upward and downward relative velocities between the sprung mass and the unsprung mass of the vehicle, a square average calculating means for seeking square average in a latest predetermined time period regarding the upward or downward relative velocity, and a control gain adjusting means for adjusting the control gain to a smaller value on the basis of magnitude of the square average.

Further, the present invention provides a suspension control apparatus comprising a shock absorber of variable damping coefficient type disposed between sprung mass and unsprung mass of a vehicle, an actuator for setting and adjusting a damping coefficient of the shock absorber of variable damping coefficient type on the basis of a control signal, an upward and downward absolute velocity detection means for detecting an upward absolute velocity and a downward absolute velocity of the vehicle, a correction value calculating means for correcting the upward or/and downward absolute velocity to a correction value by removing the upward or/and downward absolute velocity as a dead band if the upward or/and downward absolute velocity is smaller than a predetermined value, a control target calculating means for multiplying the correction value by a control gain to obtain a control target signal, a control signal generating means for emitting the control signal for the actuator on the basis of the control target signal, a square average calculating means for seeking square average in a latest predetermined time period regarding the upward or downward relative velocity, and a dead band adjusting means for adjusting the predetermined value of the dead band to a greater value on the basis of magnitude of the square average.

According to one aspect of the present invention, if the road surface condition is bad, since the control gain is adjusted to the smaller value by the control gain adjusting means, the damping coefficient becomes smaller than that in the good road surface condition, with the result that the damping force is prevented from becoming too great if the piston speed is increased.

According to another aspect of the present invention, if the road surface condition is bad, since the predetermined value of the dead band is adjusted to the greater value by the dead band adjusting means, the damping coefficient becomes smaller than that in the good road surface condition in the expanded dead band, with the result that the damping force is prevented from becoming too great if the piston speed is increased.

According to a further aspect of the present invention, the number of great amplitudes of the upward and downward accelerations of the vehicle (generated within a predetermined time period and) exceeding the predetermined amplitude threshold value is counted, and, if the number of the great amplitudes exceeds a predetermined value, it is judged that the road surface condition is bad.

Further, when the amplitude threshold value is constant, the number of the great amplitudes in a unit time period regarding the same road surface condition is increased if the vehicle speed is increased. However, with the arrangement as mentioned above, if the vehicle speed is increased, since a reference value for the number of the great amplitudes is increased, the bad road surface condition can be judged correctly even if the vehicle speed is increased.

According to a still further aspect of the present invention, when the vehicle speed is increased, since the amplitude threshold value for judging the bad road surface condition is increased, the bad road surface condition can be judged correctly even if the vehicle speed is increased.

According to a further aspect of the present invention, the number of amplitudes regarding a height of the vehicle (generated within a predetermined time period and) exceeding the predetermined amplitude threshold value is counted, and, if the number of the amplitudes exceeds predetermined value, it is judged that the road surface condition is bad.

Further, when the amplitude threshold value is constant, the number of the amplitudes regarding the same road surface condition in a unit time period is increased if the vehicle speed is increased. However, with the arrangement as mentioned above, if the vehicle speed is increased, since a reference value for the number of the amplitudes is increased, the bad road surface condition can be judged correctly even if the vehicle speed is increased.

According to a further aspect of the present invention, when the vehicle speed is increased, since the amplitude threshold value for judging the bad road surface condition is increased, the bad road surface condition can be judged correctly even if the vehicle speed is increased.

According to a further aspect of the present invention, since the square average of the upward or downward relative velocity is increased as the road surface condition becomes bad more and more, by adjusting the control gain to the smaller value in accordance with the square average of the upward or downward relative velocity, the damping coefficient becomes smaller when the vehicle is running on the bad road surface, with the result that the damping force is prevented from becoming too great if the piston speed is increased.

According to the other aspect of the present invention, since the square average of the upward or downward relative velocity is increased as the road surface condition becomes bad more and more, by adjusting the predetermined value of the dead band to the greater value in accordance with the square average of the upward or downward relative velocity, the damping coefficient becomes smaller than that in the good road surface condition, with the result that the damping force is prevented from becoming too great if the piston speed is increased.

DETAILED DESCRIPTION OF THE PREFERRED EMBODIMENTS

Figure 1:
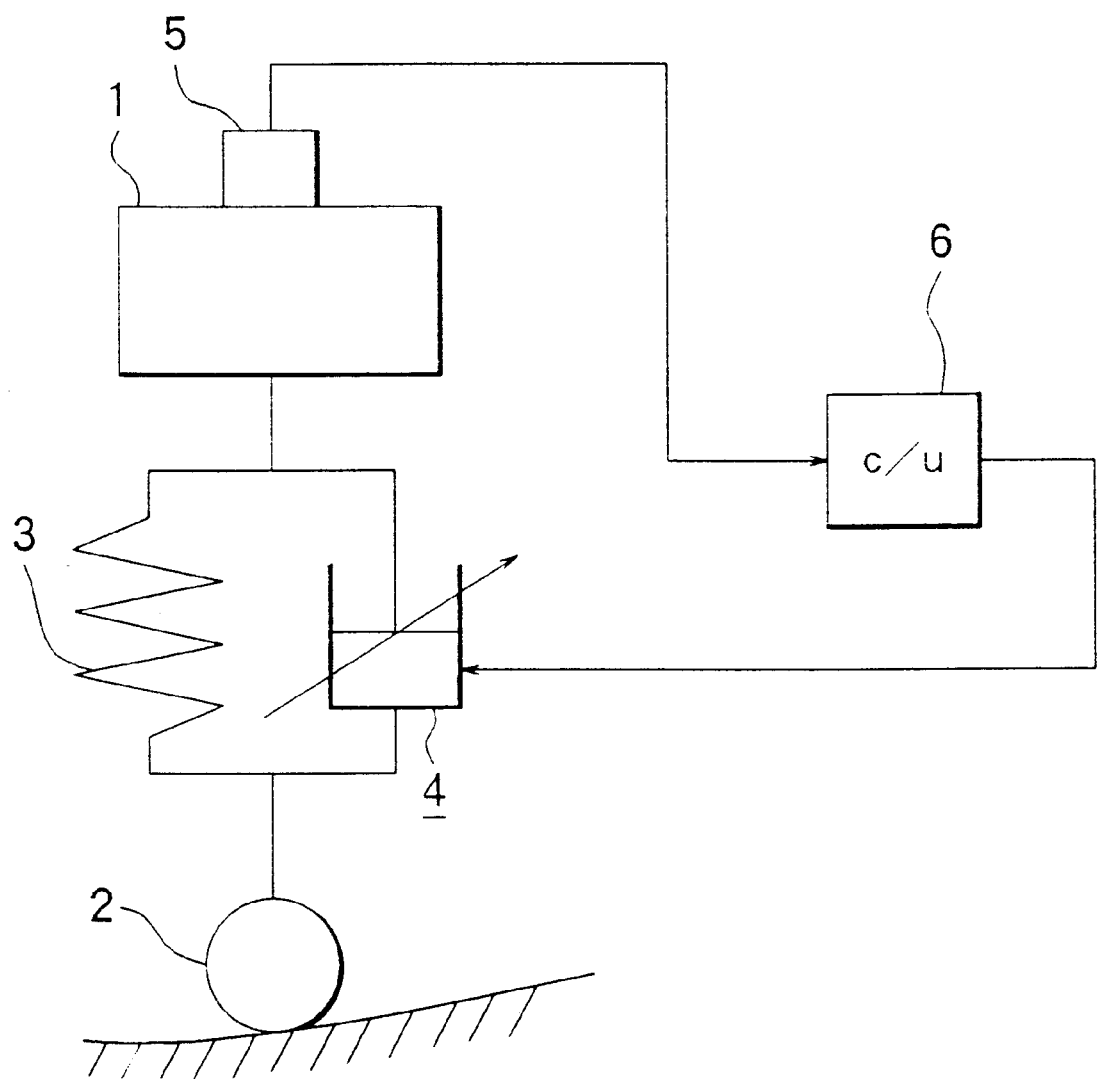
FIG. 1 is a schematic view of a suspension control apparatus according to a first embodiment of the present invention.

Now, a suspension control apparatus according to a first embodiment of the present invention will be explained with reference to FIGS. 1 to 8. In FIG. 1, a spring 3 and an expansible/contractible shock absorber 4 of inverting variable damping coefficient type are arranged in parallel between a vehicle body (sprung mass) 1 and one of four wheels (unsprung mass) 2 (only one of which is shown in FIG. 1) of a vehicle to support the vehicle body 1. The "inverting" type means that, when the damping coefficient for extension is increased, the damping coefficient for contraction is decreased, and, when the damping coefficient for extension is decreased, the damping coefficient for contraction is increased. An acceleration sensor 5 for detecting the acceleration of the vehicle in an up-and-down direction is attached to the vehicle body 1. An acceleration signal from the acceleration sensor 5 is supplied to a controller 6. Incidentally, although four shock absorbers 4 of variable damping coefficient type and four springs 3 are provided in correspondence to four wheels 2, respectively, only one set of the shock absorber and the spring is shown for the simplicity's sake.

Figure 2:
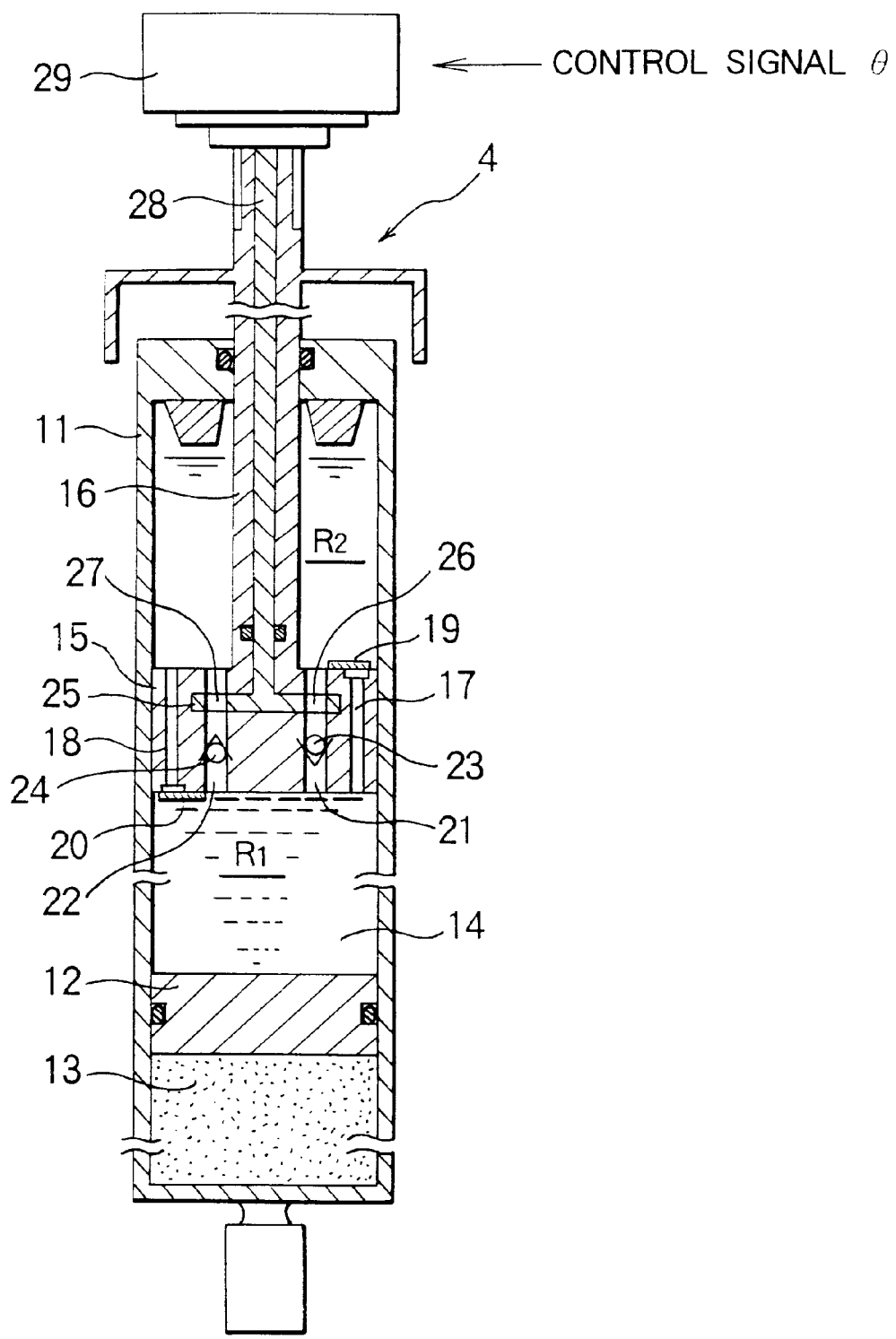
FIG. 2 is a sectional view of a shock absorber of variable damping coefficient type used with the suspension control apparatus.

As shown in FIG. 2, the shock absorber 4 of variable damping coefficient type comprises a free piston 12 slidably mounted within a cylinder 11, which piston 12 divides the interior of the cylinder into a gas chamber 13 and an oil chamber 14. High pressure gas is contained in the gas chamber 13, and a piston 15 is slidably mounted within the oil chamber 14. The oil chamber 14 is divided into a lower chamber $R_1$ and an upper chamber $R_2$ by the piston 15. The piston 15 is connected to a piston rod 16 which extends outwardly of the cylinder 11 through the upper chamber $R_2$.

First and second communication passages 17, 18 are formed in the piston 15 to communicate the lower chamber $R_1$ with the upper chamber $R_2$. A first normally closed damping valve 19 is attached to an upper surface of the piston 15 to close the communication passage 17. When the piston rod 16 is retracted to increase a pressure in the lower chamber $R_1$ so that a difference between the pressure in the lower chamber and a pressure in the upper chamber $R_2$ exceeds a predetermined value, the first damping valve 19 is opened, with the result that the lower chamber $R_1$ is communicated with the upper chamber $R_2$ through the communication passage 17. A second normally closed damping valve 20 is attached to a lower surface of the piston 15 to close the communication passage 18. When the piston rod 16 is extended to increase the pressure in the upper chamber $R_2$ so that the difference between the pressure in the upper chamber and the pressure in the lower chamber $R_1$ exceeds a predetermined value, the second damping valve 20 is opened, with the result that the lower chamber $R_1$ is communicated with the upper chamber $R_2$ through the communication passage 18. Third and fourth communication passages 21, 22 diametrically opposed to each other with the interposition of a central axis of the piston rod 16 are also formed in the piston 15. The third and fourth communication passages 21, 22 are communicated with the upper chamber $R_2$ and the lower chamber $R_1$.

Figure 3:
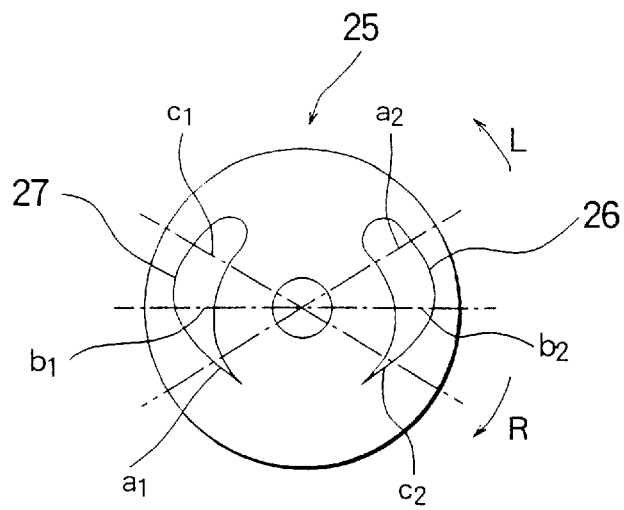
FIG. 3 is a plan view of a movable plate incorporated into the shock absorber of variable damping coefficient type.

Check valves 23, 24 are arranged in the third and fourth communication passages 21, 22, respectively. The check valve 23 permits only an oil flow from the lower chamber $R_1$ to the upper chamber $R_2$, and the check valve 24 permits only an oil flow from the upper chamber $R_1$ to the lower chamber $R_1$. Within the piston 15, a disc-shaped movable plate 25 is mounted for rotational movement around the central axis of the piston rod 16. Upper and lower surfaces of the movable plate 25 extends radially across the third and fourth communication passages 21, 22. As shown in FIG. 3, a pair of arcuate elongated slots 26, 27 concentrically extending along a circumferential direction and diametrically opposed to each other are formed in the movable plate 25. An area of the elongated slot 26 is gradually decreased along a direction shown by the arrow R in FIG. 3; whereas, an area of the elongated slot 27 is gradually increased along the direction R.

Figure 4:
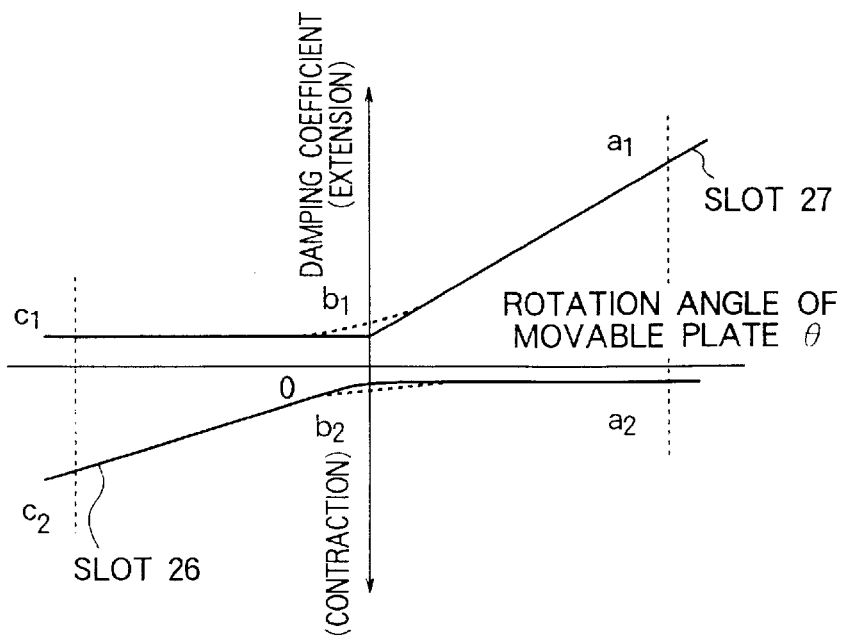
FIG. 4 is a graph showing a relation between a rotation angle of the movable plate and a damping coefficient.

When the movable plate 25 is rotated in the direction R or a direction shown by the arrow L, areas of portions of the slots 26, 27 facing the third and fourth communication passages 21, 22 are gradually increased or decreased, so that a damping feature of the shock absorber 4 of variable damping coefficient type as shown by the solid lines in FIG. 4 can be obtained. In order to make the damping coefficient change continuously, the shape of the slots may be changed in the area around the central portions $b_1$, $b_2$ so that the damping feature shown by the broken lines in FIG. 4 is obtained.

Incidentally, in FIG. 2, the reference numeral 28 denotes an operation rod rotatably mounted within the piston rod 16 concentrically with the central axis of the piston rod and having a lower end connected to the movable plate 25; and 29 denotes an actuator such as a stepping motor attached to an upper end of the operation rod 28 and adapted to rotate the movable plate 25 in the direction R or the direction L. The actuator 29 serves to rotate the operation rod 28 in response to a control signal θ emitted from a control signal generating portion 44 of the controller 6.

Next, a relation between portions ($a_2$-$b_2$-$c_2$, $a_1$-$b_1$-$c_1$) of the slots 26, 27 facing the third and fourth communication passages 21, 22 and the damping coefficient will be explained. Here, the portions of the slots 26, 27 facing the third and fourth communication passages 21, 22 are represented by a rotation angle θ of the movable plate 25. Incidentally, when central positions $b_2$, $b_1$ of the slots 26, 27 face the third and fourth communication passages 21, 22, the position of the movable plate 25 is referred to as "reference position" (θ=0) hereinafter.

(1) When the movable plate 25 is rotated from the reference position in the direction R, i.e., when the movable plate 25 is rotated in a positive direction (θ>0), the position $a_2$ of the slot 26 faces the third communication passage 21 and the position $a_1$ of the slot 27 faces the fourth communication passage 22. Consequently, the oil is apt to flow from the lower chamber $R_1$ to the upper chamber $R_2$ and is hard to flow from the upper chamber $R_2$ to the lower chamber $R_1$, thereby increasing the damping coefficient for extension and decreasing the damping coefficient for contraction.

(2) When the movable plate 25 is rotated from the reference position in the direction L, i.e., when the movable plate 25 is rotated in a negative direction (θ<0), the position $c_2$ of the slot 26 faces the third communication passage 21 and the position $c_1$ of the slot 27 faces the fourth communication passage 22. Consequently, the oil is hard to flow from the lower chamber $R_1$ to the upper chamber $R_2$ and is apt to flow from the upper chamber $R_2$ to the lower chamber $R_1$, thereby decreasing the damping coefficient for extension and increasing the damping coefficient for contraction.

The controller 6 is generally constituted by an integration treatment portion 41, a correction value calculating portion 42, a control target value calculating portion 43, the above-mentioned control signal generating portion 44, a large amplitude number calculating portion 45, a judging portion 46, and a parameter adjusting portion 47. The integration treatment portion 41 and the acceleration sensor 5 constitute an upward and downward absolute velocity detection means in which an acceleration signal a of the acceleration sensor 5 is integrated to obtain an upward or downward absolute velocity S which is in turn sent to the correction value calculating portion 42 acting as a correction value calculating means. The correction value calculating portion 42 stores therein information (a graph showing this information is illustrated in a block representing the correction value calculating portion 42 in FIG. 5) representative of the correspondence between data in the range excluding the portion which is smaller than a predetermined value A (which portion is referred to as "dead band" A hereinafter) of the upward and downward absolute velocities S and data S' (referred to as "corrected upward or downward absolute velocity" hereinafter) proportional to the aforementioned data, so that, by inputting the upward or downward absolute velocity S to this correction value calculating portion 42, a corresponding corrected upward or downward absolute velocity S' can be obtained, which absolute velocity S' is in turn sent to the control target value calculating portion 43 acting as a control target value calculating means.

Figure 9:
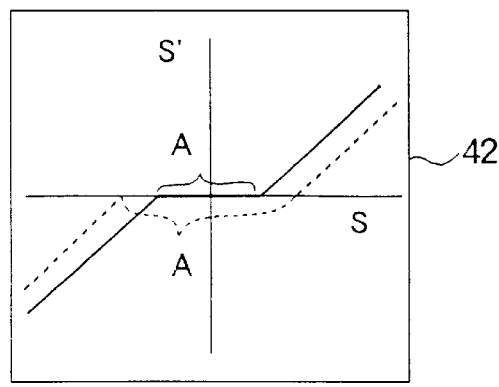
FIG. 9 is a graph schematically showing another example of information stored in a correction value calculating portion.

Incidentally, information as shown in FIG. 9 may be stored into the correction value calculating portion 42, so that the corrected upward and downward absolute velocities S' can be obtained on the basis of the stored information. In the example shown in FIG. 5, only the width of the dead band A is made variable without changing the relationship between the upward and downward absolute velocity S and the corrected upward and downward absolute velocity S' as shown by the broken lines. On the other hand, in the example of FIG. 9, the dead band A is changed by laterally shifting the lines representing the relationship between the absolute velocity S and the corrected absolute velocity S'. In this case, when the predetermined value A is increased, the dead band A becomes great, and a value of the corrected upward or downward absolute velocity S' becomes small in comparison with the inputted upward or downward absolute velocity S. Thus, when the information shown in FIG. 9 is used, even if a control gain K is not variable, generally the same advantage as obtained when both a control gain K in FIG. 5 and the dead band A are variable is obtained by merely changing the dead band A.

The control target value calculating portion 43 serves to multiply the corrected upward or downward absolute velocity S' by the control gain K to obtain a control target value C which is in turn sent to the control signal generating portion 44 acting as a control signal generating means. The control signal generating portion 44 emits a control signal θ corresponding to the rotation angle θ of the movable plate 25 on the basis of the control target value C, which signal is outputted to the actuator 29. In this case, information (a graph showing this information is illustrated in a block representing the control signal generating portion 44 in FIG. 5) representative of the relationship between the control signals C set on the basis of the feature of the shock absorber 4 of variable damping coefficient type and the corresponding control signals θ is stored in the control signal generating portion 44, so that, by inputting the control target value C to the control signal generating portion 44, the corresponding control signal θ can be obtained.

When the actuator 29 receives the control signal θ, the movable plate 25 is rotated by the actuator, thereby establishing the desired damping coefficient for extension or contraction of the shock absorber 4 of variable damping coefficient type. The principle of this control is explained in more detail in Japanese Patent Laid-open No. 5-330325 (1993). For example, if the absolute velocity of the vehicle body 1 is increased in a positive direction (upward direction of the vehicle) to increase the target value of the damping coefficient regarding the positive direction, as shown by the graph in the block representing the control signal generating portion 44 in FIG. 5, the control signal θ for increasing the rotation angle θ of the movable plate 25 in the positive direction is sent to the actuator 29, with the result that the damping coefficient for extension is increased and the damping coefficient for contraction is decreased, as described regarding the above paragraph (1). On the other hand, if the absolute velocity S of the vehicle body 1 is increased in a negative direction (downward direction of the vehicle) to increase the target value of the damping coefficient regarding the negative direction, the control signal θ for increasing the rotation angle θ of the movable plate 25 in the negative direction is sent to the actuator 29, with the result that the damping coefficient for extension is decreased and the damping coefficient for contraction is increased.

Figure 5:
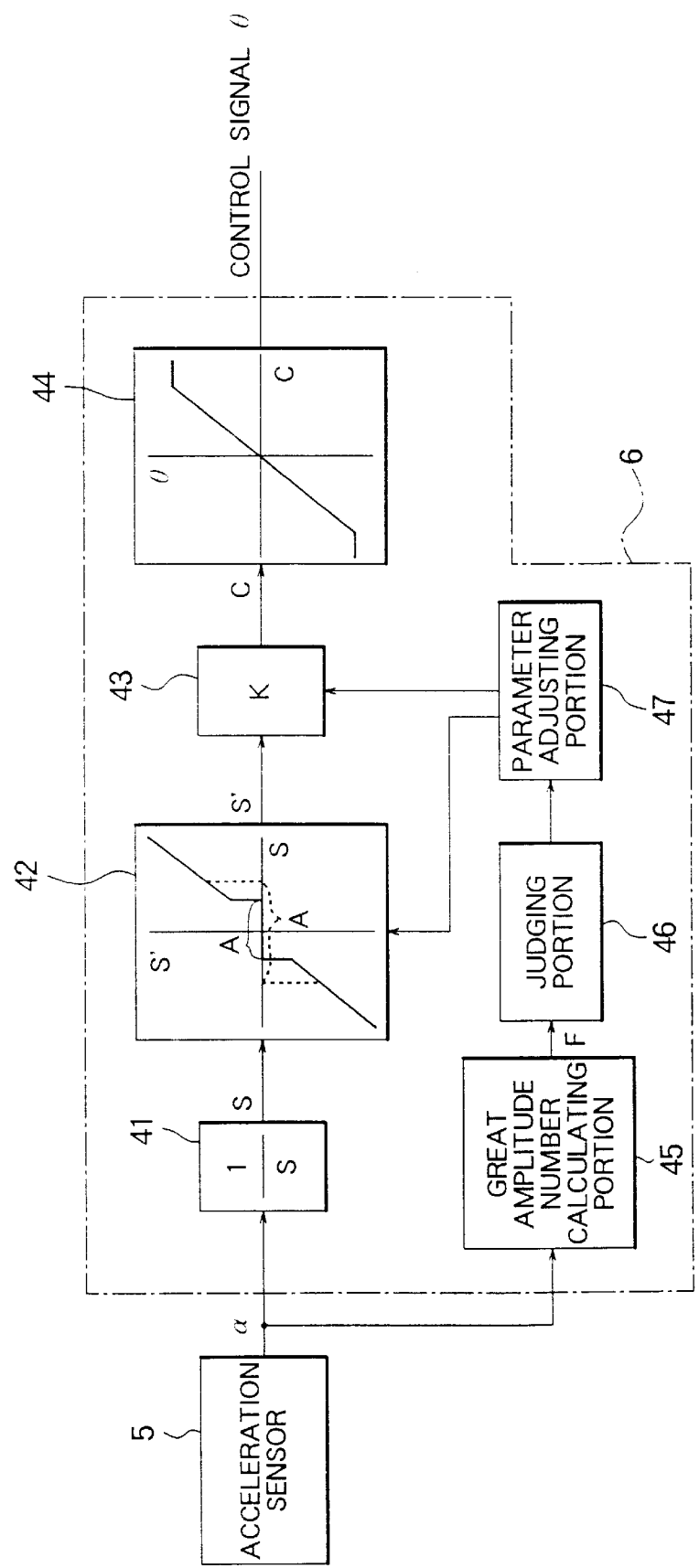
FIG. 5 is a block diagram of a controller of the suspension control apparatus.

Incidentally, in the graph shown in the block representing the control signal generating portion 44 in FIG. 5, the reason why the value θ is constant in areas where absolute values of the target value is great is that, when the movable plate 25 is rotated more than a predetermined amount, the third and fourth communication passages 21, 22 are closed to prevent the oil flows from passing through the third and fourth communication passages 21, 22.

The change number calculating portion or great amplitude number calculating portion 45 has threshold values regarding the acceleration signal α (FIG. 8), so that the number of changes wherein values of two successive acceleration signals α change from inside to outside of the range defined and by the upper and lower threshold values within a predetermined time period of 500 msec is counted to obtain a great amplitude number signal F (corresponding to the counted value) which is in turn sent to the judging portion 46. The judging portion 46 previously stores information representative of road surface conditions corresponding to the great amplitude numbers counted by the great amplitude number calculating portion 45, so that, when the great amplitude number signal F from the great amplitude number calculating portion 45 is inputted to the judging portion, the latter judges a corresponding road surface condition, and the judged result is sent to the parameter adjusting portion 47 acting as a control gain adjusting means and a dead band adjusting means. The parameter adjusting portion 47 serves to adjust the control gain K and the dead band A (predetermined value A) in response to the judged result from the judging portion 46. Incidentally, the parameter adjusting portion 47 may be designed so that at least one of the control gain K and the dead band A can be adjusted in response to the judged result from the judging portion 46.

Figure 6:
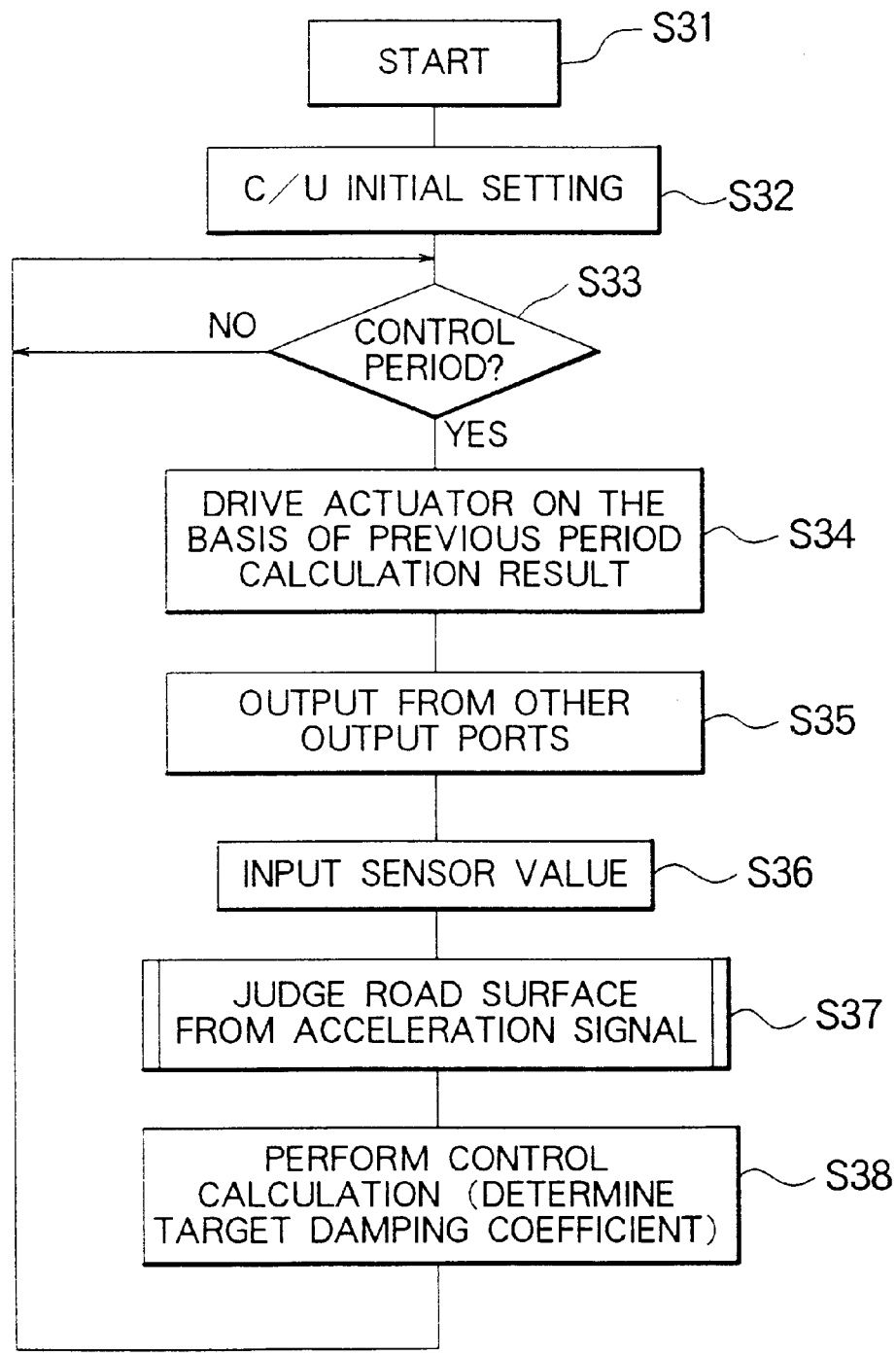
FIG. 6 is a flow chart showing control contents of the controller.

As shown in FIG. 6, when electric power generated upon engine start is supplied to the controller 6 having the above-mentioned construction (step S31), the initial setting is effected (step S32), and then it is judged whether a control period is established or not (step S33). In the step S33, the judgement for judging whether the control period is established is repeated until the control period is established.

In the step S33, if it is judged that the control period is established, the actuator 29 is driven (step S34). Then, in a step S35, signals are outputted to mechanisms other than the actuator 29, thereby controlling such mechanisms. Then, the acceleration signal α from the acceleration sensor 5 is read (step S36). Thereafter, the road surface condition is judged (step S37). The control target value C is determined on the basis of the judged result obtained in the step S37, and the actuator 29 is driven by the control signal θ corresponding to the control target value, thereby establishing the desired damping coefficient.

Now, the road surface judging sub-routine shown in the step S37 will be explained with reference to FIG. 7. First of all, in steps S42 to S47, frequency of the acceleration signal α within the latest time period of 500 msec is calculated. That is to say, a threshold value (amplitude threshold value) having a predetermined absolute value for the acceleration signal α is set. If the absolute value of the previous acceleration signal $α_F$ is smaller than the threshold value and absolute value of the present acceleration signal $α_P$ is greater than the threshold value (steps S42, S45), a counter is increased by "1" (one increment) (step S46); whereas, if the absolute value of the previous acceleration signal $α_F$ is greater than the threshold value and the absolute value of the present acceleration signal $α_P$ is smaller than the threshold value (steps S42, S43), the counter is also increased by "1" (step S44), thereby determining the number of changes wherein the absolute values of two successive acceleration signals α ($α_F$, $α_P$) change from below to above or from above to below regarding the amplitude threshold value within a time period of 500 msec (i.e., determining the great amplitude number) (step S47). Incidentally, in this embodiment, while the number changing from below to above or from above to below was determined, the number may be determined by counting only one of the occasions of changing from below to above and from above to below.

Following the step S47, it is judged whether the great amplitude number signal F is greater than a predetermined number reference value FTH (step S48). If the great amplitude number signal F is greater than the predetermined number reference value FTH, it is judged that the road surface condition is bad (step S49); whereas, if the great amplitude number signal F does not reach the predetermined number reference value FTH, it is judged that the road surface condition is good (step S50).

Then, the renewal treatment is effected by replacing the previous acceleration signal $α_F$ by the present acceleration signal $α_P$ (step S51), and, in a next step S52, it is judged whether the road surface is good or not. If YES (good road), the control gain K/dead band A for good road is set with respect to the control target value calculating portion 43 or the correction value calculating portion 42 (step S53); whereas, if NO (bad road), the control gain K/dead band A for bad road is set (step S54). In this case, the control gain K of the control gain K/dead band A for bad road is smaller than that of the control gain K/dead band A for good road, and the dead band A of the control gain K/dead band A for bad road is greater than that of the control gain K/dead band A for good road. When the step S53 or S54 is finished, the sub-routine of the step S37 is completed (step S55), and then the program goes to a step S38 of the main routine.

In the step S38, in a condition that the control gain K/dead band A for good road or bad road is set with respect to the control target value calculating portion 43 or the correction value calculating portion 42 as mentioned above, by inputting the acceleration signal α from the acceleration sensor 5, a desired control signal θ is generated. That is to say, when the acceleration signal α is inputted from the acceleration sensor 5, the integration treatment portion 41 integrates the acceleration signal α to obtain the upward or downward absolute velocity S which is in turn sent to the correction value calculating portion 42.

If the upward or downward absolute velocity S is included in the dead band A set as mentioned above, the correction value calculating portion 42 ignores the absolute velocity; whereas, if the upward or downward absolute velocity S exceeds the dead band A, the correction value calculating portion 42 calculates data proportional to the upward or downward absolute velocity S to seek the corrected upward or downward absolute velocity S' which is in turn sent to the control target value calculating portion 43. The control target value calculating portion 43 serves to multiply the corrected upward or downward absolute velocity S' by the control gain K set as mentioned above, thereby obtaining the control target value C which is in turn sent to the control signal generating portion 44. The control signal generating portion 44 generates the control signal θ corresponding to the rotation angle θ of the movable plate 25 on the basis of the control target value C, which control signal is in turn sent to the actuator 29.

Then, the actuator 29 drives the movable plate 25 to rotate the latter, thereby adjusting the open areas of the third and fourth communication passages 21, 22. In this way, the desired damping coefficients for extension and contraction of the shock absorber 4 of variable damping coefficient type can be obtained in accordance with the road surface condition.

As mentioned above, since the dead band A is set to be smaller in case of good road and to be greater in case of bad road, when the vehicle is running on the bad road surface, the damping force is prevented from becoming greater than a desired value to provide over-control. Therefore, the frequent up/down vibration generated upon running on the bad road surface can be adequately controlled as in the good road surface, thereby improving the riding comfort of the vehicle. Further, as mentioned above, since the control gain K is set to be greater in case of good road and to be smaller in case of bad road, when the vehicle is running on the bad road surface, the frequent up/down vibration generated upon running on the bad road surface can be adequately controlled as in the good road surface, thereby improving the riding comfort of the vehicle.

Figure 10:
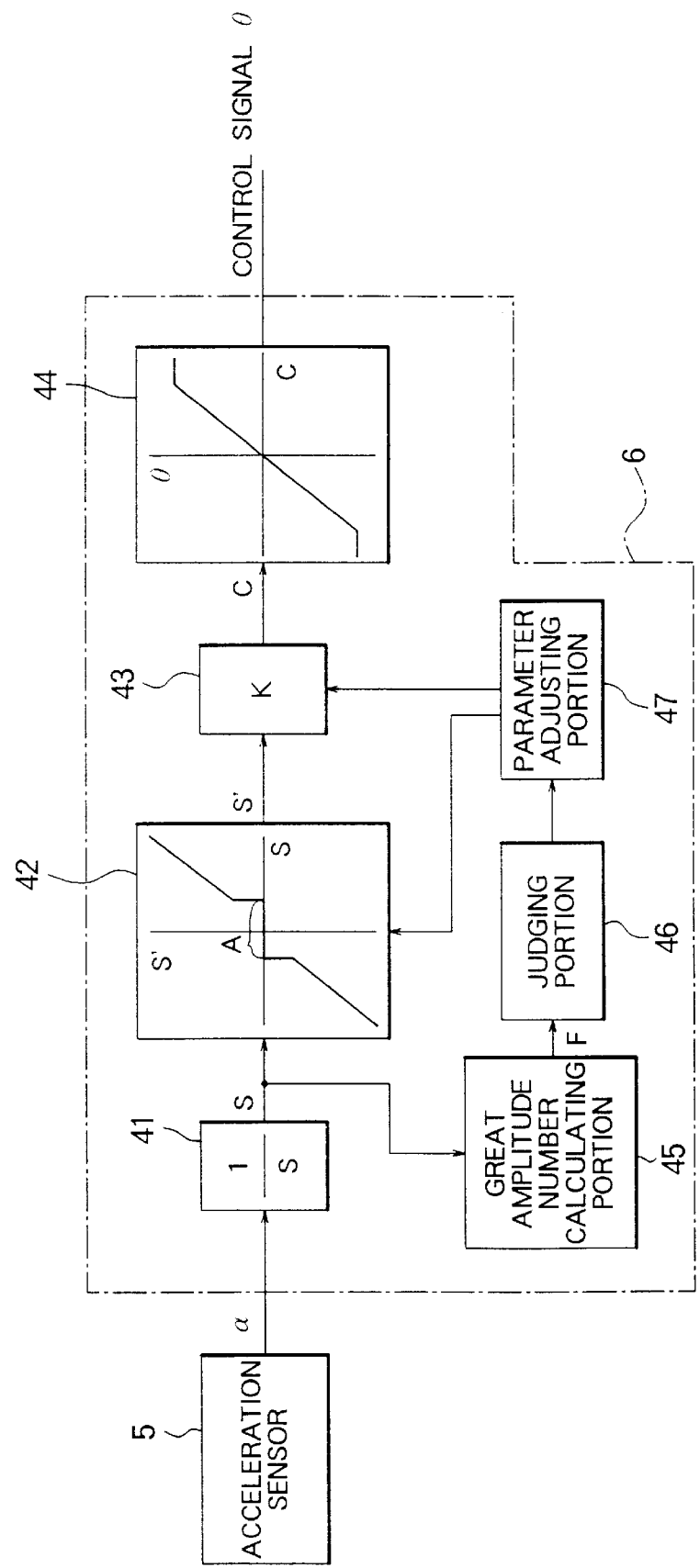
FIG. 10 is a block diagram showing another example of a controller.
Figure 11:
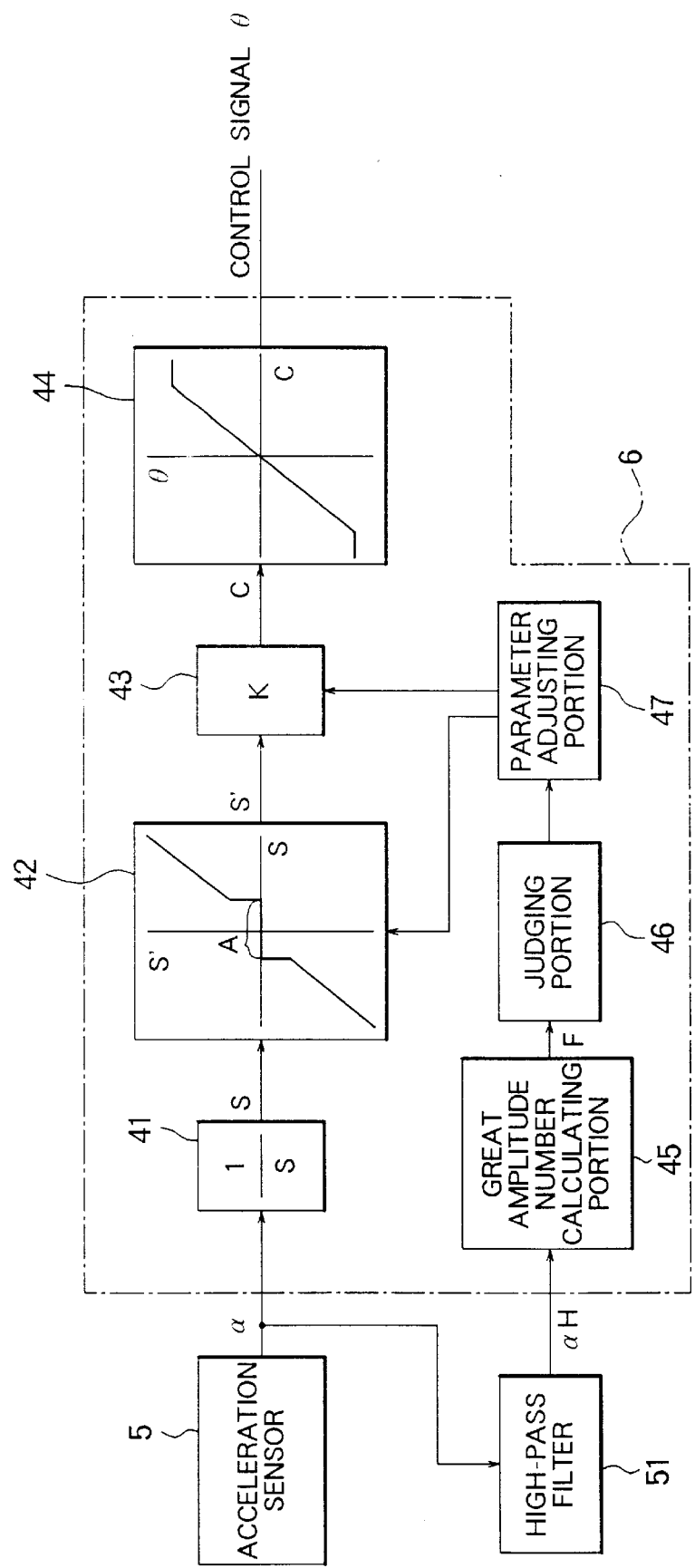
FIG. 11 is a schematic block diagram showing a suspension control apparatus according to a second embodiment of the present invention.

Incidentally, in the illustrated embodiment, while an example that the great amplitude number calculating portion 45 is connected to the output of the acceleration sensor 5 was explained, in place of this example, as shown in FIG. 10, the great amplitude number calculating portion 45 may be connected to an output of the integration treatment portion 41. In this case, the great amplitude number calculating portion 45 has amplitude threshold values for the upward and downward velocity signals from the integration treatment portion 41 so that the number of changes wherein the absolute values of two successive velocity signals change from below to above and/or from above to below regarding the amplitude threshold value within a time period of 500 msec is determined to obtain the great amplitude number signal F which is in turn sent to the judging portion 46.

Next, a suspension control apparatus according to a second embodiment of the present invention will be explained with reference to FIGS. 11 to 14. This suspension control apparatus differs from that of the first embodiment in the following points. That is to say, although the great amplitude number calculating portion 45 is connected to the output of the acceleration sensor 5 in the first embodiment, a high-pass filter 51 is disposed between the great amplitude number calculating portion 45 and the acceleration sensor 5 in the second embodiment. Further, although the previous acceleration signal $\alpha_F$ and the present acceleration signal $\alpha_P$ directly obtained from the acceleration sensor 5 are treated by the controller 6 in the first embodiment, a previous acceleration signal $\alpha_{FH}$ and a present acceleration signal $\alpha_{PH}$ passed through the high-pass filter 51 are treated by the controller 6 in the second embodiment. Since the other functional and constructural elements of the second embodiment are the same as those of the first embodiment, explanation thereof will be omitted.

Figure 13:
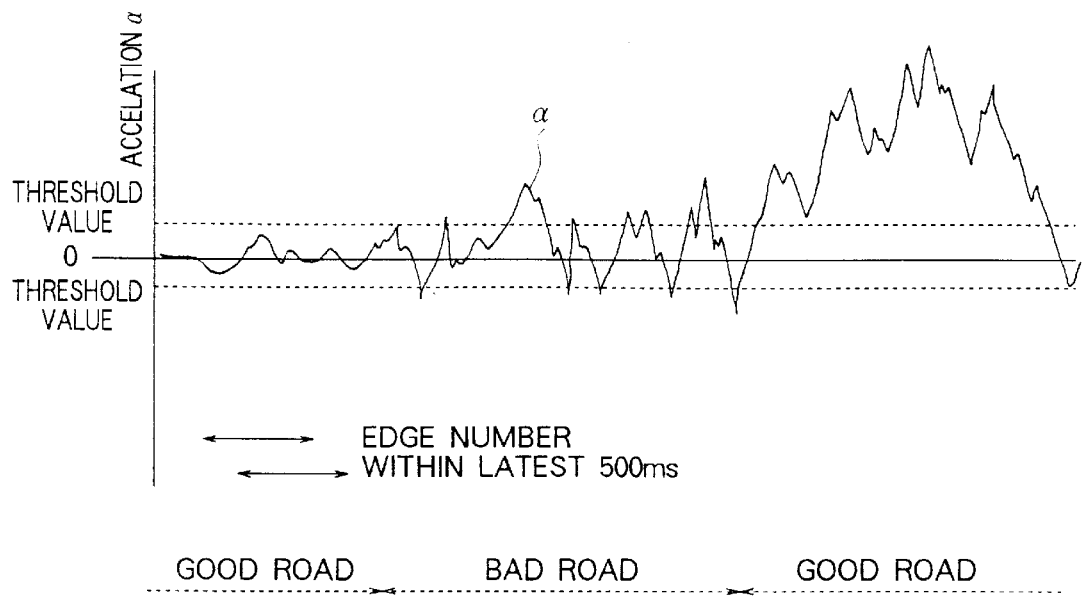
FIG. 13 is a graph showing a relation between an acceleration signal in the suspension control apparatus and a threshold value.
Figure 14:
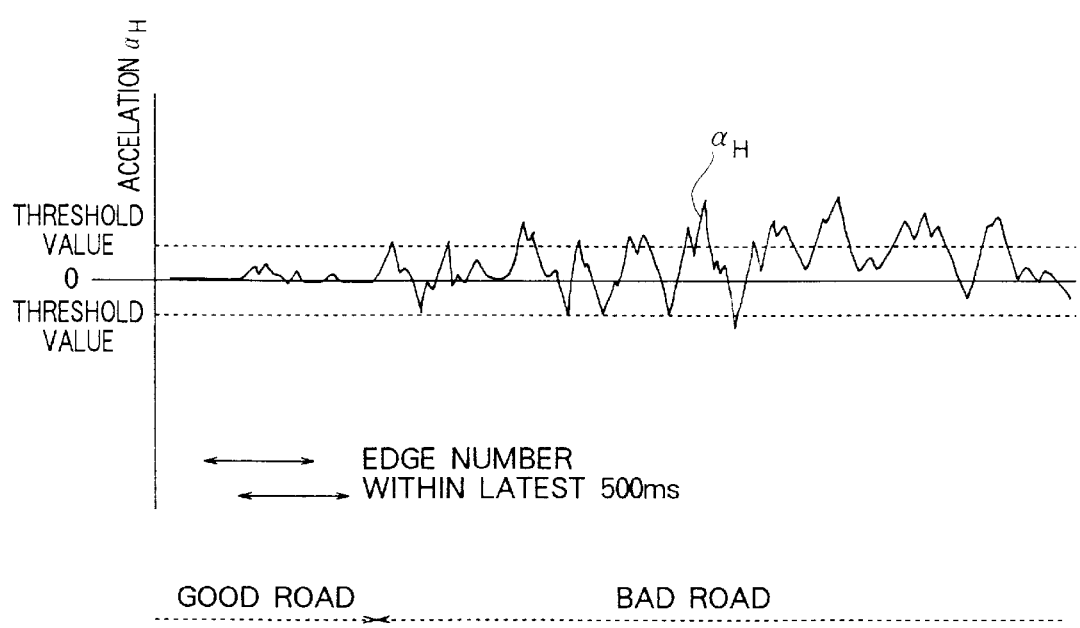
FIG. 14 is a graph showing a relation between a signal from an acceleration sensor through a high-pass filter and a threshold value.

When the acceleration signal $\alpha$ is inputted from the acceleration sensor 5, the high-pass filter 51 removes a low frequency component from the acceleration signal while remaining a high frequency component. The high frequency component of the acceleration signal passed through the high-pass filter is outputted to the great amplitude number calculating portion 45 as an acceleration signal $\alpha_H$. For example, when an acceleration signal $\alpha$ as shown in FIG. 13 is inputted, by passing this signal through the high-pass filter, an acceleration signal $\alpha_H$ as shown in FIG. 14 is obtained, which signal $\alpha_H$ is in turn sent to the great amplitude number calculating portion 45. The great amplitude number calculating portion 45 has amplitude threshold values for the acceleration signal $\alpha_H$ (passed through the high-pass filter), so that the number of changes wherein the values of two successive acceleration signals $\alpha_H$ (passed through the high-pass filter) change from below to above and from above to below regarding the amplitude threshold value within a time period of 500 msec is determined to obtain the great amplitude number signal F which is in turn sent to the judging portion 46.

Figure 7:
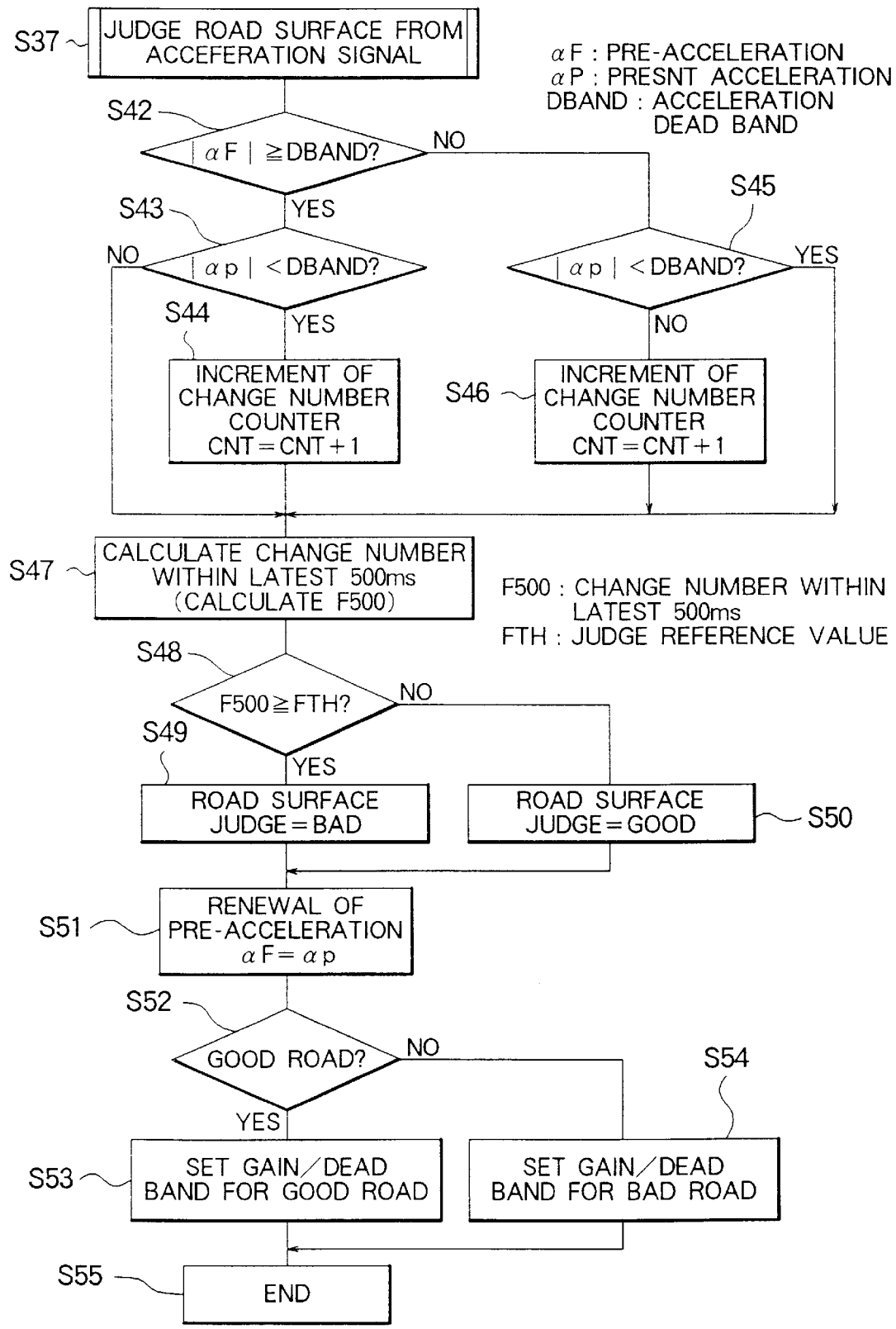
FIG. 7 is a flow chart showing a sub-routine for judging a road surface condition in the flow chart of FIG. 6.
Figure 8:
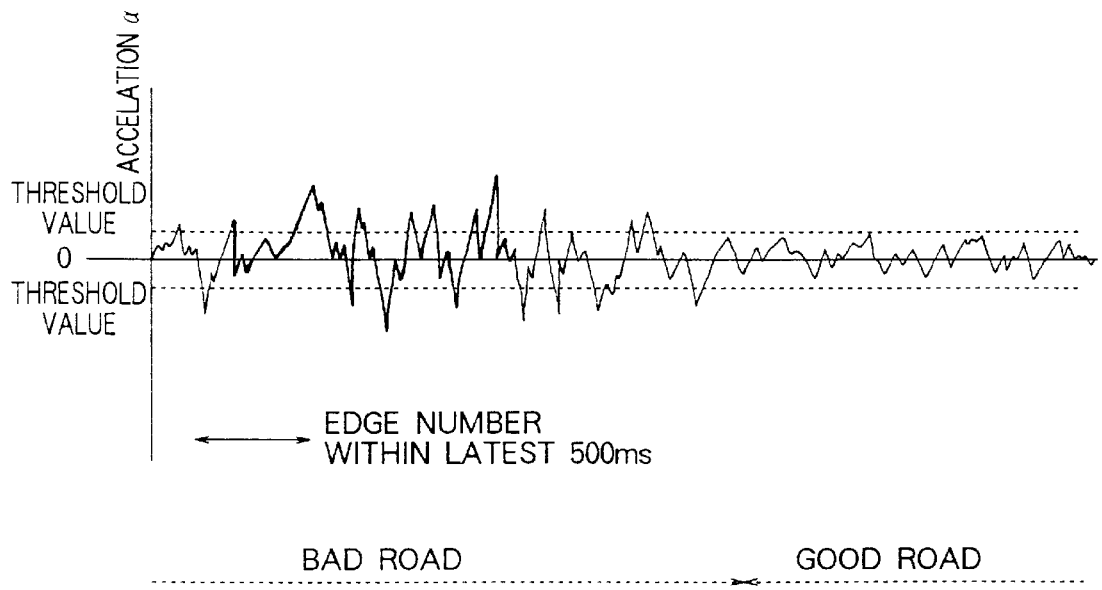
FIG. 8 is a graph showing a relation between a detection signal from an acceleration sensor and a threshold value.
Figure 12:
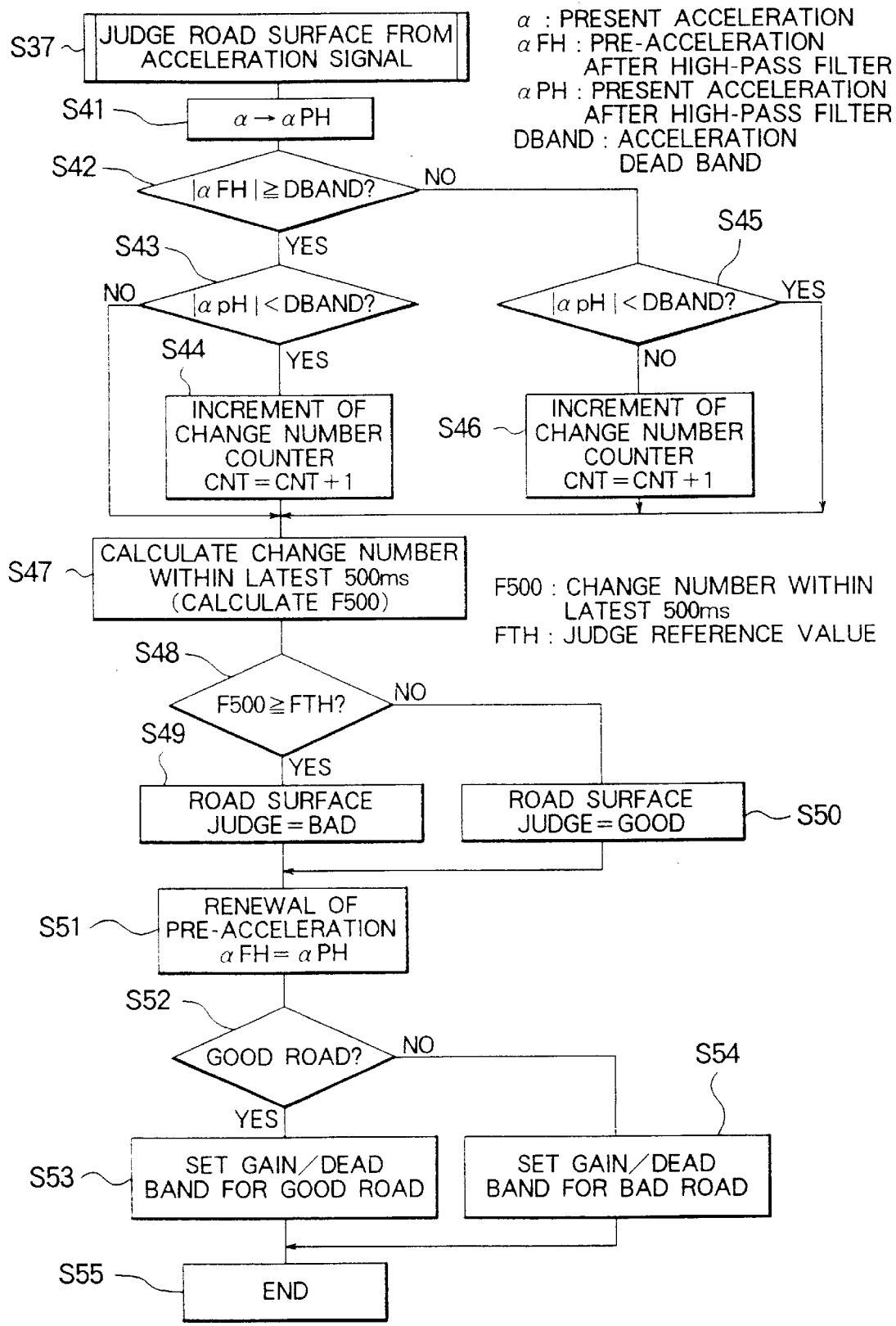
FIG. 12 is a flow chart showing a sub-routine for judging a road surface condition in the suspension control apparatus.

The controller 6 in the second embodiment carries out a road surface condition judging sub-routine shown in FIG. 12 in place of the road surface condition judging sub-routine in the step S37 shown in FIG. 7. The road surface condition judging sub-routine shown in FIG. 12 differs from that of FIG. 7 in the following points. That is to say, the previous acceleration signal $\alpha_{FH}$ and the present acceleration signal $\alpha_{PH}$ passed through the high-pass filter 51 (in place of the directly inputted previous acceleration signal $\alpha_F$ and the present acceleration signal $\alpha_P$) are treated (steps S42, S43, S45, S51 and the like), and, prior to the treatment in the step S42, the acceleration signal $\alpha$ is passed through the high-pass filter 51 to obtain the acceleration signal $\alpha_H$ (step S41). The other treatments are the same as those of FIG. 7.

As is in the first embodiment, also in the second embodiment, since the dead band A is set to be smaller in case of good road and to be greater in case of bad road, when the vehicle is running on the bad road surface, the frequent up/down vibration generated upon running on the bad road surface can be adequately controlled as in the good road surface, thereby improving the riding comfort of the vehicle. Further, as mentioned above, since the control gain K is set to be greater in case of good road and to be smaller in case of bad road, when the vehicle is running on the bad road surface, the frequent up/down vibration generated upon running on the bad road surface can be adequately controlled as in the good road surface, thereby improving the riding comfort of the vehicle.

Incidentally, if the frequent up/down vibration is generated upon running on the bad road surface, such a vibration is appeared as the high frequency component of the acceleration signal $\alpha$. However, in the second embodiment, since the acceleration signal $\alpha$ is passed through the high-pass filter 51, the low frequency component overlapped with the high frequency component can be removed by the filter, with the result that the high frequency component of the acceleration signal $\alpha$, i.e., the frequent up/down vibration can be detected with high accuracy, thereby achieving the good riding comfort of the vehicle.

Figure 15:
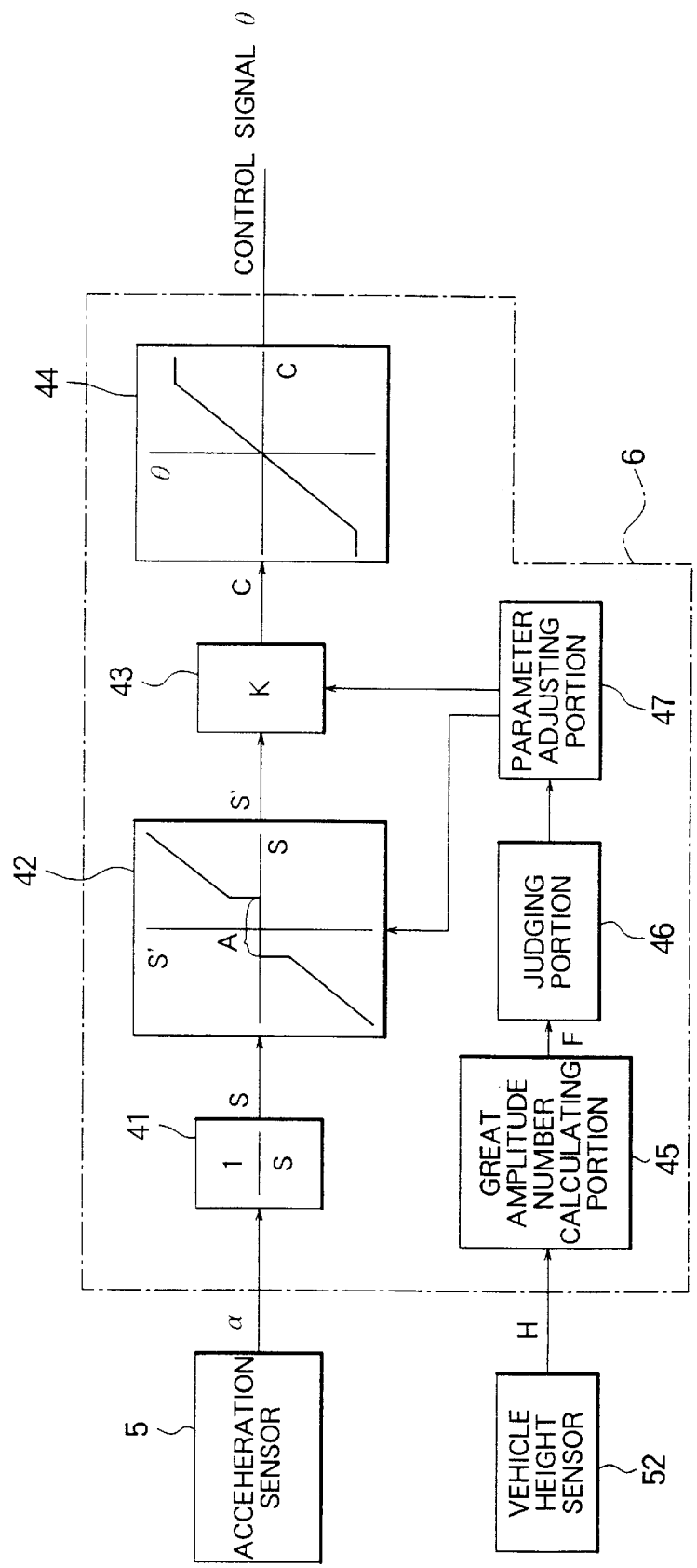
FIG. 15 is a schematic block diagram showing a suspension control apparatus according to a third embodiment of the present invention.

Next, a suspension control apparatus according to a third embodiment of the present invention will be explained with reference to FIG. 15. This suspension control apparatus differs from that of the first embodiment in the following points. That is to say, while the great amplitude number calculating portion 45 is connected to the output of the acceleration sensor 5 in the first embodiment, a vehicle height sensor 52 is attached to the vehicle body 1 and the great amplitude number calculating portion 45 is connected to an output of the vehicle height sensor 52 in the third embodiment. Further, in the first embodiment, although the great amplitude number calculating portion 45 has the amplitude threshold values for the upward or downward acceleration signal $\alpha$, so that the number of changes wherein the values of two successive velocity signals change from below to above and/or from above to below regarding the amplitude threshold value within a time period of 500 msec is determined to obtain the great amplitude number signal F which is in turn sent to the judging portion 46, the great amplitude number calculating portion 45 according to the third embodiment has amplitude threshold values for the vehicle height signal, so that the number of changes wherein the values of two successive vehicle height signals change from below to above and/or from above to below regarding the amplitude threshold value within a time period of 500 msec is determined to obtain the great amplitude number signal F which is in turn sent to the judging portion 46. Since the other functional and constructional elements of the third embodiment are the same as those of the first embodiment, explanation thereof will be omitted. In addition, in the first embodiment, although the road surface condition is judged on the basis of the acceleration signal $\alpha$, in the third embodiment, the road surface condition is judged on the basis of the vehicle height signal. Incidentally, a flow chart for judging the road surface condition in the third embodiment is not shown.

As is in the first embodiment, also in the third embodiment, since the dead band A is set to be smaller in case of good road and to be greater in case of bad road, when the vehicle is running on the bad road surface, the frequent up/down vibration generated upon running on the bad road surface can be adequately controlled as in the good road surface, thereby improving the riding comfort of the vehicle. Incidentally, a high-pass filter may be disposed between the vehicle height sensor 52 and the great amplitude number calculating portion 45. It is also possible to judge the road condition by obtaining a vertical relative velocity signal by differentiating the vehicle height signal H, determining the number of changes wherein the velocity signal changes from below to above and/or from above to below of the amplitude threshold value to provide the great amplitude number signal F and then sending this signal F to the judging portion 46.

Next, a suspension control apparatus according to a fourth embodiment of the present invention will be explained with reference to FIG. 16. Since the fourth embodiment is the same as the first embodiment regarding the elements and portions shown in FIGS. 1 to 4, explanation of these elements and portions will be omitted. Further, in FIG. 16, the same elements and portions as those of the first embodiment are designated by the same reference numerals, and explanation thereof will be omitted. In this fourth embodiment, regarding the same road surface condition, since the frequency is increased if the vehicle speed is increased, the judgement for the road surface condition is changed in accordance with the vehicle speed.

Figure 16:
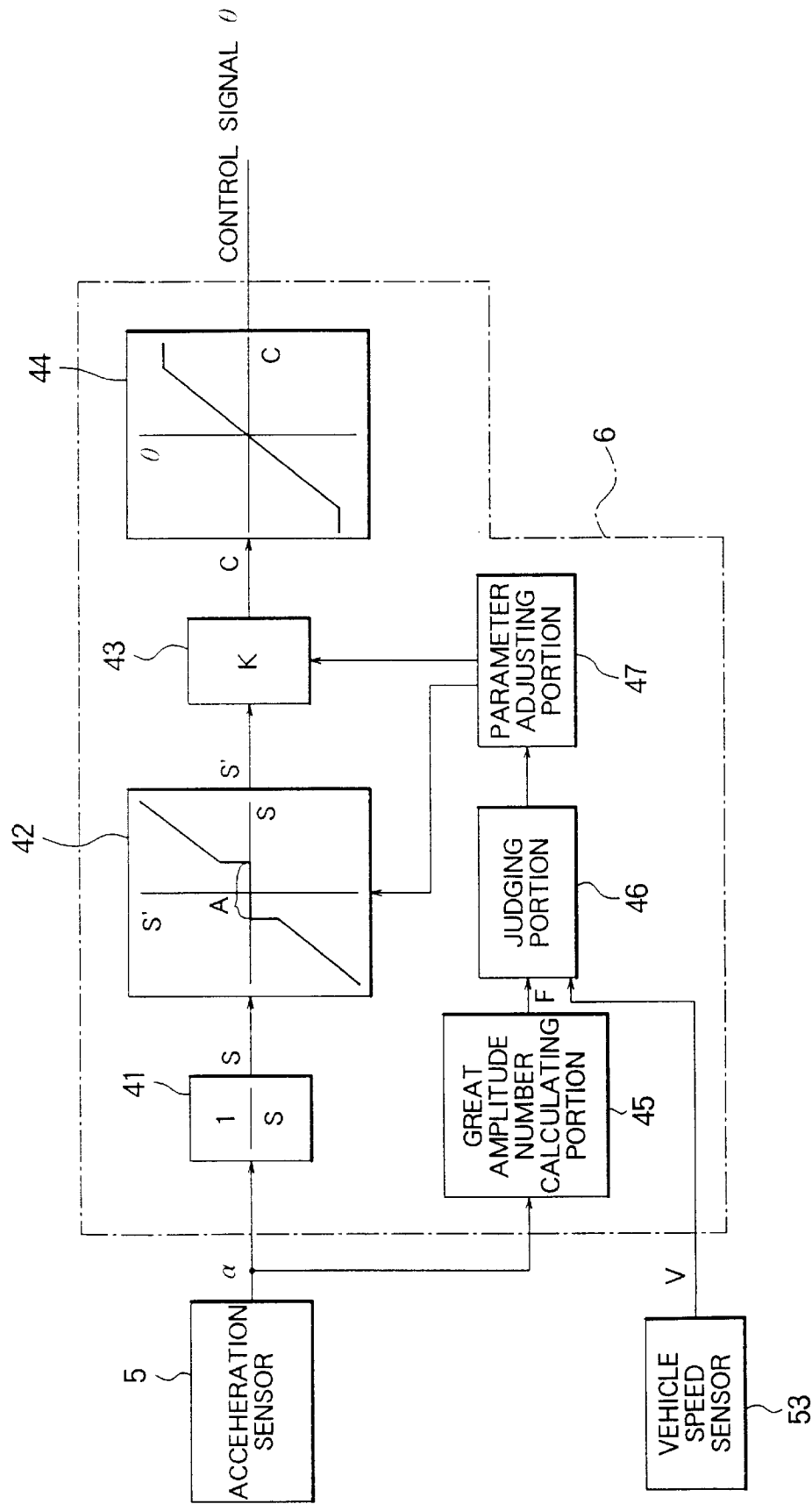
FIG. 16 is a schematic block diagram showing a suspension control apparatus according to a fourth embodiment of the present invention.
Figure 17:
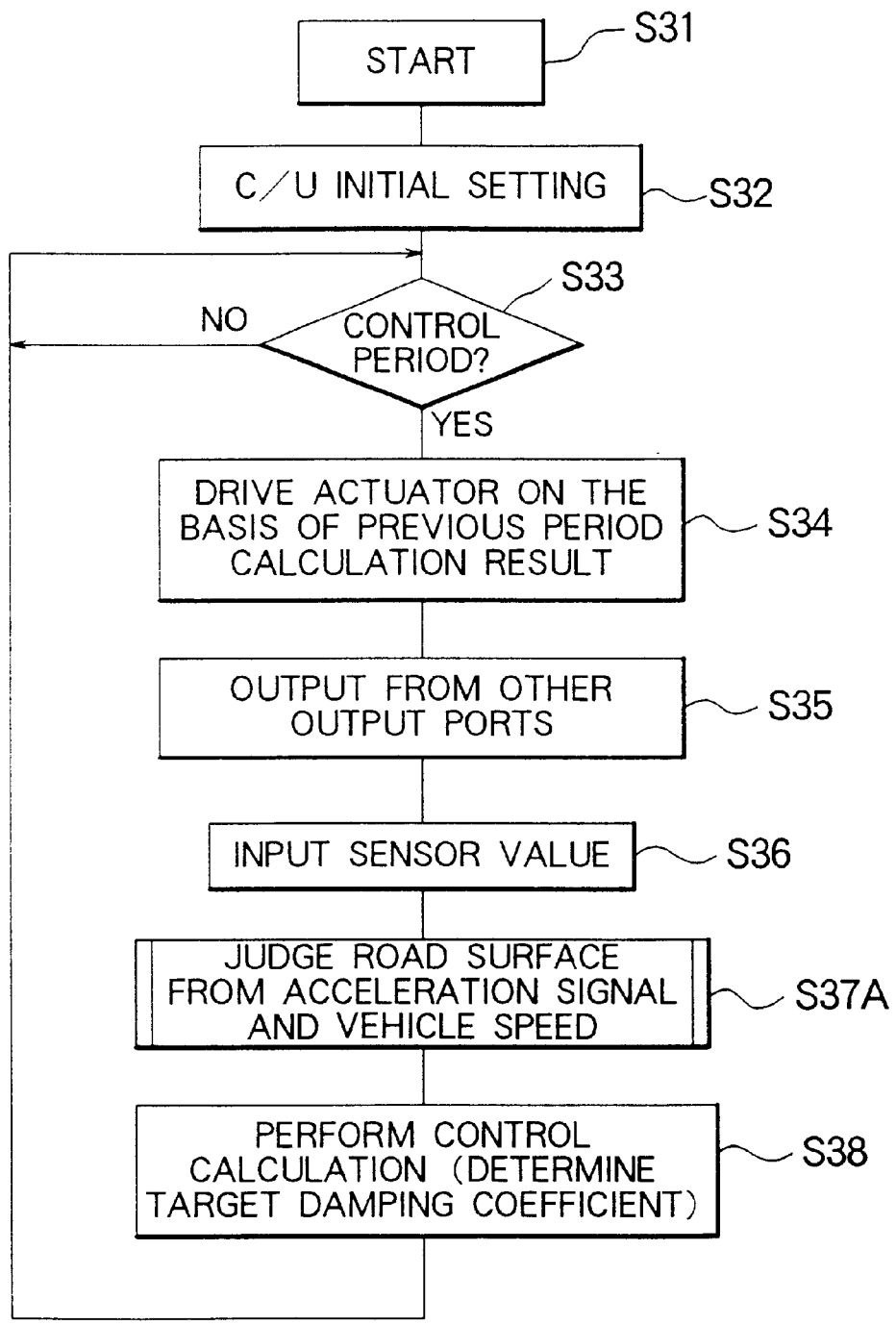
FIG. 17 is a flow chart showing control contents of a controller according to a fifth embodiment of the present invention.
Figure 18:
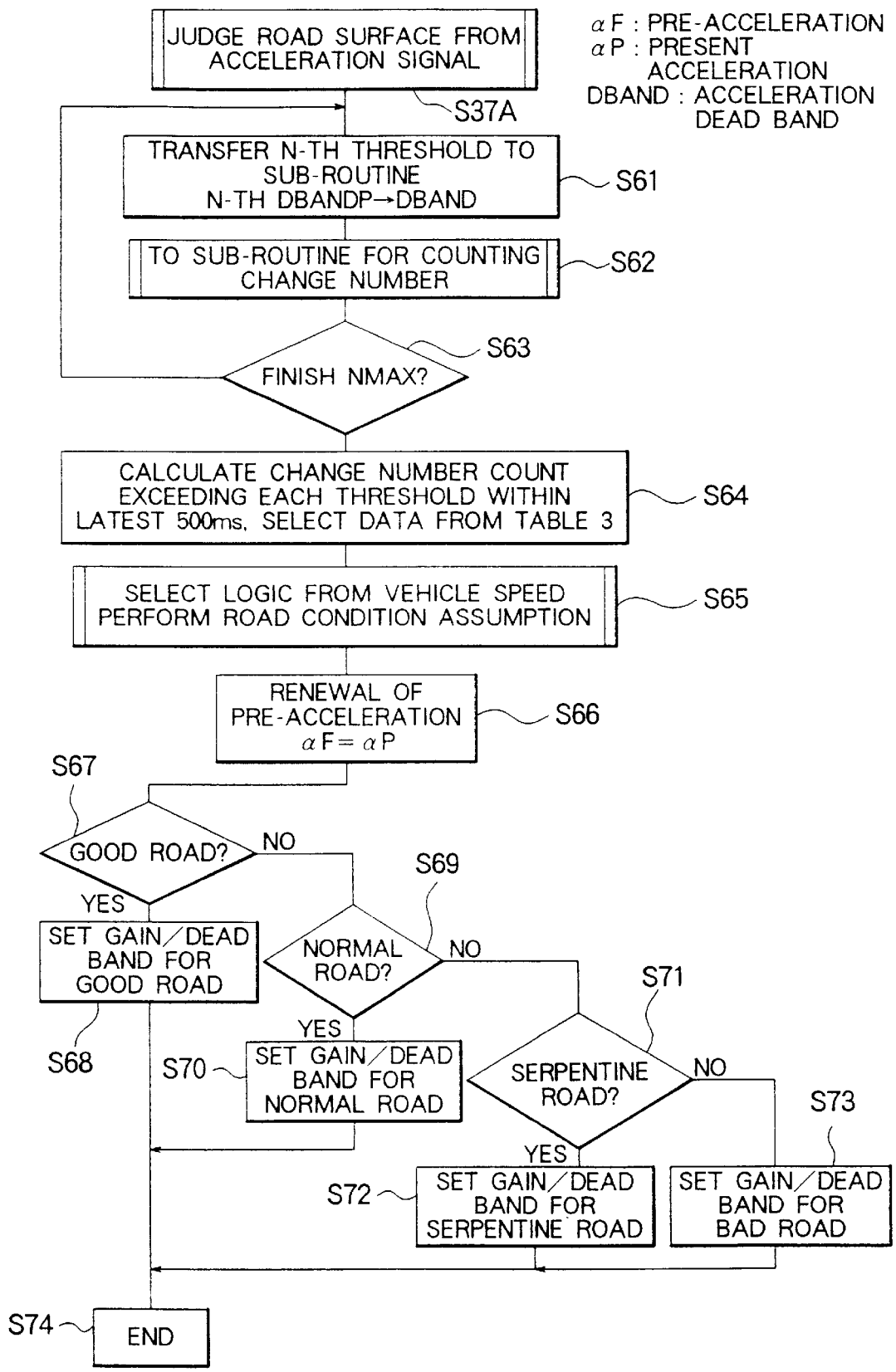
FIG. 18 is a flow chart showing a sub-routine for judging a road surface condition in the flow chart of FIG. 17.
Figure 19:
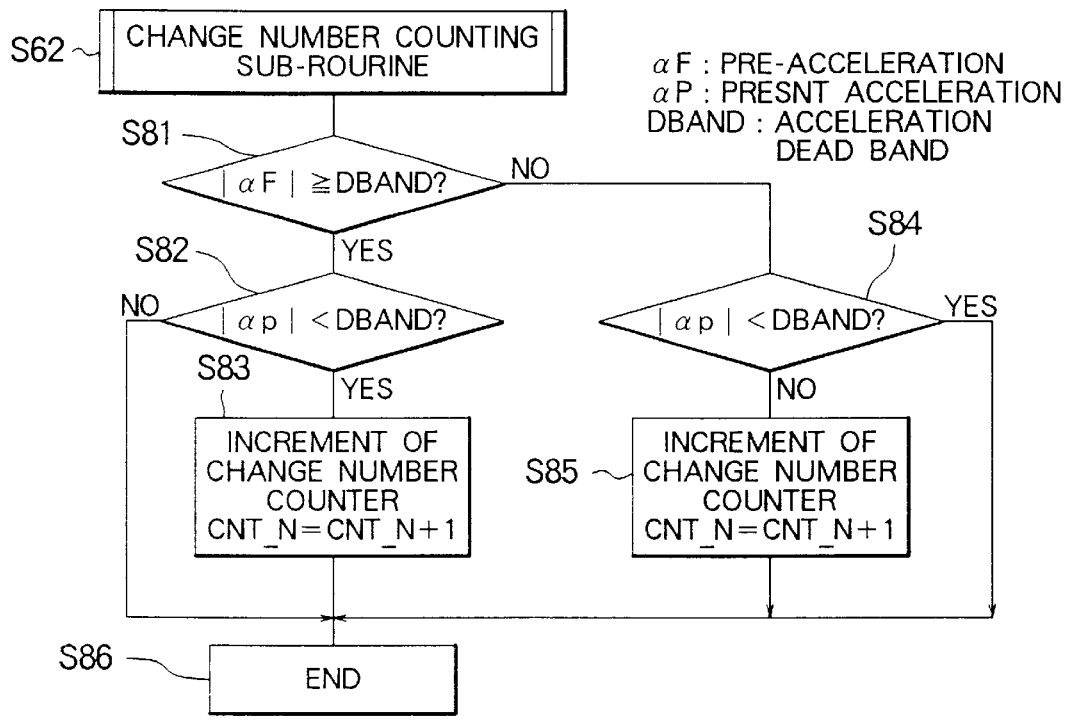
FIG. 19 is a flow chart showing a sub-routine for counting the number of great amplitudes in the flow chart of FIG. 17.
Figure 20:
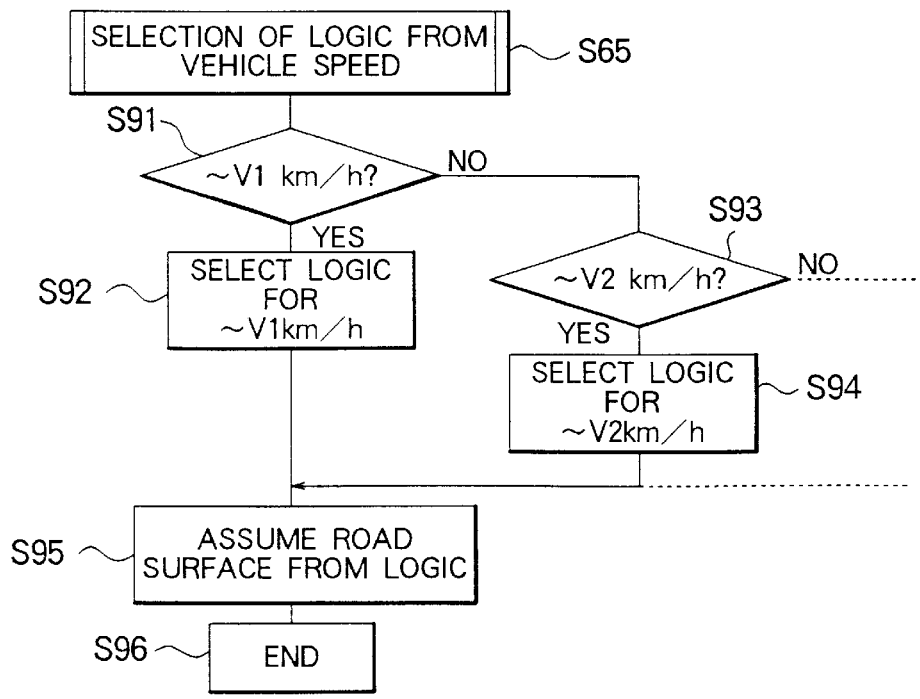
FIG. 20 is a flow chart showing a portion of the sub-routine for judging a road surface condition in FIG. 18.
Figure 21:
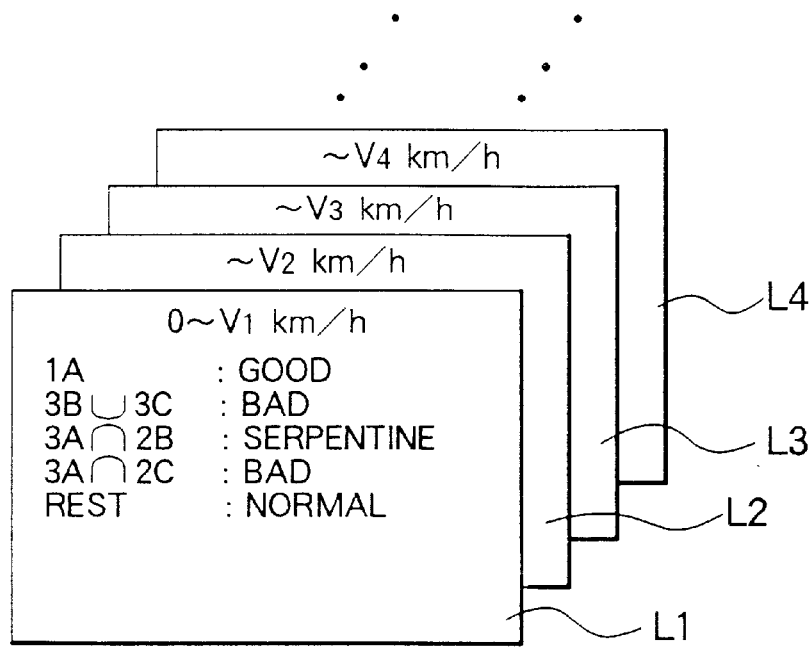
FIG. 21 is a schematic view showing information stored in a judging portion of FIG. 16.
Figure 22:
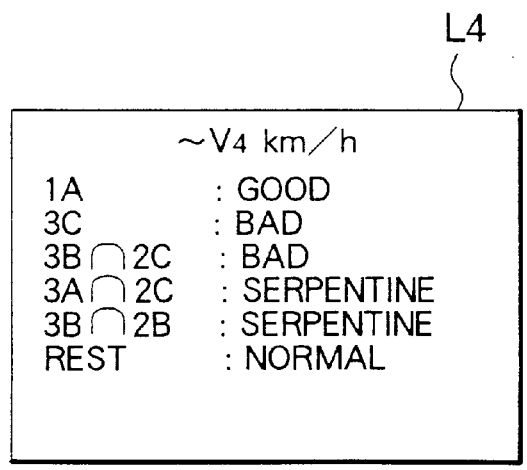
FIG. 22 is a schematic view showing the stored information.
Figure 23:
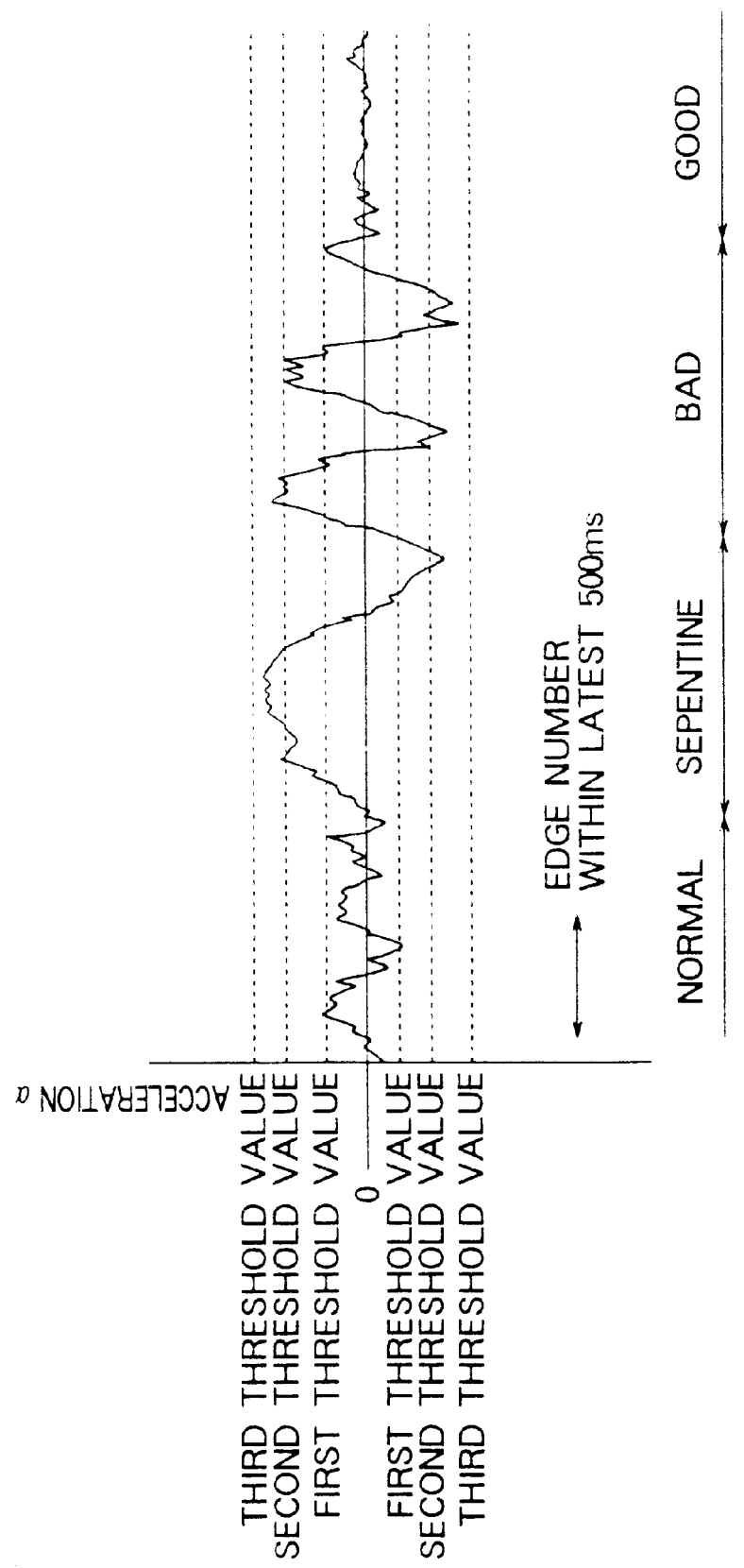
FIG. 23 is a graph showing a relation between an acceleration signal outputted from an acceleration sensor of FIG. 16 and first, second and third threshold values.

In FIG. 16, a vehicle speed sensor 53 attached to the vehicle body 1 serves to detect the vehicle speed which is in turn sent to the judging portion 46.

In the fourth embodiment, a judging portion 46 previously stores information (contents thereof are shown in the following Table 1) for determining the road surface condition in accordance with the number of great amplitudes obtained from the great amplitude number calculating portion 45 and is designed so that, when the vehicle speed signal from the vehicle speed sensor 53 and the great amplitude number signal F are inputted to the judging portion, the road surface condition is judged by selecting road surface condition information corresponding to these signals, and the judged result is sent to the parameter adjusting portion 47.

TABLE 1

| vehicle | great amplitude number | | | |
|---|---|---|---|---|
| speed | 0 | −3 | −5 | −∞ |
| $0 - V_1$ | good road | bad road | bad road | bad road |
| $- V_2$ | good road | serpentine | bad road | bad road |

TABLE 1-continued

| vehicle | great amplitude number | | | |
|---|---|---|---|---|
| speed | 0 | −3 | −5 | −∞ |
| $- V_3$ | good road | normal road | serpentine | bad road |
| $- V_4$ | good road | normal road | normal road | bad road |

(Remarks: $0 < V_1 < V_2 < V_3 < V_4$ (Km/h); the road surface condition becomes worse in the order of: good road → normal road → serpentine (serpentine road) → bad road)

In the first embodiment, while the good road or bad road was judged on the basis of the great amplitude number in the light of a single distinguishing reference, in the fourth embodiment, the good road, normal road, serpentine (serpentine road) or bad road is judged on the basis of the three distinguishing reference values, and different values of control gain K/dead band A are set in accordance with four kinds of judged results. Thus, in the fourth embodiment, the control can be effected with high accuracy on the basis of the road surface condition, thereby improving the riding comfort of the vehicle.

It is also possible to adapt the system such that, by inputting the vehicle speed signal V from the vehicle speed sensor 53, the amplitude threshold value of the great amplitude number calculating portion 45 may be changed, for example, as shown in the following Table 2. With this arrangement, when the vehicle speed is low, the sensitivity is increased, thereby judging the road surface condition more correctly.

TABLE 2

| vehicle speed | $0 - V_1$ | $-V_2$ | $-V_3$ | $-V_4$ |
|---|---|---|---|---|
| threshold value | small | middle | | great |

Next, a fifth embodiment of the present invention will be explained with reference to FIGS. 17 to 23. This embodiment differs from the fourth embodiment in the point that the judging portion 46 stores a relation between a threshold value and a change number shown in the following Table 3 and a vehicle speed/road judgement logic shown in FIGS. 21 and 22, so that the judge treatment in the judging portion 46 also differs from that of the fourth embodiment 5 because of the difference in the stored data. Explanation regarding the same elements and portions as those of the fourth embodiment will be omitted. Further, the control contents of the controller 6 will be explained with reference to the first embodiment.

TABLE 3

| | change number | | |
|---|---|---|---|
| threshold value | 0 | 1–3 | −∞ |
| first threshold | 1A | 1B | 1C |
| second threshold | 2A | 2B | 2C |
| third threshold | 3A | 3B | 3C |

The controller 6 performs treatment shown in a step S37A in place of the step S37 of FIG. 6 (first embodiment). In the step S37A, the road surface condition is judged on the basis of the acceleration signal $\alpha$ from the acceleration sensor 5 and the vehicle speed signal V from the vehicle speed sensor 53. Now, the contents of the step S37A will be explained with reference to FIGS. 18 to 20. First of all, in a step S61, the first threshold value is transferred to a change number count sub-routine in a step S62. Here, the sub-routine in the step S62 will be explained referring to FIG. 19. In this sub-routine, the treatment is effected by using the first, second and third threshold values having small, middle and great absolute values, respectively, as comparison reference values.

First of all, the treatment is effected by using the first threshold value transferred from the step S61 as the comparison reference value. That is to say, if the absolute value of the previous acceleration signal $\alpha_F$ is smaller than the first threshold value and the absolute value of the present acceleration signal $\alpha_P$ is greater than the first threshold value (steps S81, S84), the counter is increased by "1" (one increment) (step S85); whereas, if the absolute value of the previous acceleration signal $\alpha_F$ is greater than the first threshold value and the absolute value of the present acceleration signal $\alpha_P$ is smaller than the first threshold value (steps S81, S82), the counter is also increased by "1" (one increment) (step S83), thereby determining the number of changes wherein the values of two successive acceleration signals $\alpha$ change from below to above and/or from above to below regarding the first threshold value within a time period of 500 msec (this number corresponds to the frequency of the acceleration signals $\alpha$). Then, the program is returned to a step S63 in the main routine. In the step S63, it is judged whether the number of the threshold values transferred from the step S61 reaches the total number (three in this embodiment) of the threshold values.

As mentioned above, when the first threshold value is transferred, since the judgement in the step S63 is NO, the program is returned to the step S61. Then, in the step S61, the second threshold value is transferred to the step S62. In the sub-routine of the step S62, the great amplitude number is determined by using the second threshold value as the comparison reference value. Thereafter, similarly, the great amplitude number is determined by using the third threshold value as the comparison reference value. After the great amplitude number is determined regarding the third threshold value, since the judgement in the step S63 becomes YES, the program goes to a step S64.

In the step S64, the data (for example, 3A, 2B, 1C or the like) corresponding to the first to third threshold values and the great amplitude number is selected from the Table 3. In this case, the judging portion 46 previously stores first, second, third, fourth, . . . , n-th logics $L_1, L_2, L_3, L_4, \ldots$, $L_n$ per the ranges of $0-V_1$, $-V_2$, $-V_3$, $-V_4$, . . . ($0<V_1<V_2<V_3<V_4< \ldots$ ) (Km/h). The first, second, third, fourth, . . . , n-th logics $L_1, L_2, L_3, L_4, \ldots, L_n$ include judging information representative of road surface conditions in connection with combination of data shown in the Table 3. For example, the first logic includes the judging information as shown in the following Table 4.

TABLE 4

| $0 - V_1$ Km/h | | | |
|---|---|---|---|
| 1A: | good road, | 3B∪3C: | bad road, |
| 3A∩2B: | serpentine road, | 3A∩2C: | bad road, |
| others: | normal road | | |

It is judged whether the vehicle speed is included in either one of $0-V_1$, $-V_2$, $-V_3$, $-V_4$, . . . , (Km/h) (steps S91, S93 and the like), and the corresponding logic is selected among the first, second, third, fourth, n-th logics on the basis of the judged result (steps S92, S94 and the like). For example, if the vehicle speed is $0-V_1$ (Km/h), the first logic is selected, whereas, if the vehicle speed is $-V_2$ (Km/h), the second logic is selected (step S94). The road surface condition is judged on the basis of the selected first, second, third, fourth, or n-th logics $L_1, L_2, L_3, L_4, \ldots$, or $L_n$ (step S95), and then the road surface judging sub-routine is completed (step S96). After the road surface judging sub-routine is completed (step S96), the renewal treatment is effected by replacing the previous acceleration signal $\alpha_F$ by the present acceleration signal $\alpha_P$P (step S66).

Then, the control gain K/dead band A is set on the basis of the judged result in the step S95. That is to say, if it is judged that the road surface condition is good, the judgement in the step S67 becomes YES, and the control gain K/dead band A for good road is set (step S68). On the other hand, if the normal road is judged, the control gain K/dead band A for normal road is set (steps S69, S70). Similarly, if the serpentine road is judged, the control gain K/dead band A for serpentine road is set (steps S71, S72), and, it the bad road is judged, the control gain K/dead band A for bad road is set (step S73).

When the treatment in the step S68, S70, S72 or S73 is finished, the sub-routine of the step S37 is completed (step S74), and the program goes to the step S38. In the step S38, in a condition that the control gain K/dead band A for good road, normal road, serpentine road or bad road is set with respect to the control target value calculating portion 43 and the correction value calculating portion 42 as mentioned above, by inputting the acceleration signal $\alpha$ from the acceleration sensor 5, a desired control signal $\theta$ is generated. That is to say, when the acceleration signal $\alpha$ is inputted from the acceleration sensor 5, the integration treatment portion 41 integrates the acceleration signal $\alpha$ to obtain the upward or downward absolute velocity S which is in turn sent to the correction value calculating portion 42.

If the upward or downward absolute velocity S is included in the dead band A for good road, normal road, serpentine road or bad road set as mentioned above, the correction value calculating portion 42 ignores the absolute velocity; whereas, if the upward or downward absolute velocity S exceeds the dead band A, the correction value calculating portion 42 determines data proportional to the upward or downward absolute velocity S, i.e., the corrected upward or downward absolute velocity S' which is in turn sent to the control target value calculating portion 43. The control target value calculating portion 43 serves to multiply the corrected upward or downward absolute velocity S' by the control gain K set as mentioned above (among the control gains K for good road, normal road, serpentine road and bad road), thereby obtaining the control target value C which is in turn sent to the control signal generating portion 44.

The control signal generating portion 44 generates the control signal $\theta$ corresponding to the rotation angle $\theta$ of the movable plate 25 on the basis of the control target value C, which control signal is in turn sent to the actuator 29. Then, the actuator 29 drives the movable plate 25 to rotate the latter on the basis of the control signal $\theta$, thereby adjusting the open areas of the third and fourth communication passages 21, 22. In this way, the desired damping coefficients for extension and contraction of the shock absorber 4 of variable damping coefficient type can be obtained in accordance with the road surface condition.

In the first embodiment, while it was judged whether the road surface condition is good or bad, in the fifth embodiment, since the good road, normal road, serpentine road or bad road is judged and the different control gain K/dead band A can be set in accordance with the four judged results, the control can be effected with high accuracy in accordance with the road surface condition, thereby improving the riding comfort of the vehicle.

Figure 24:
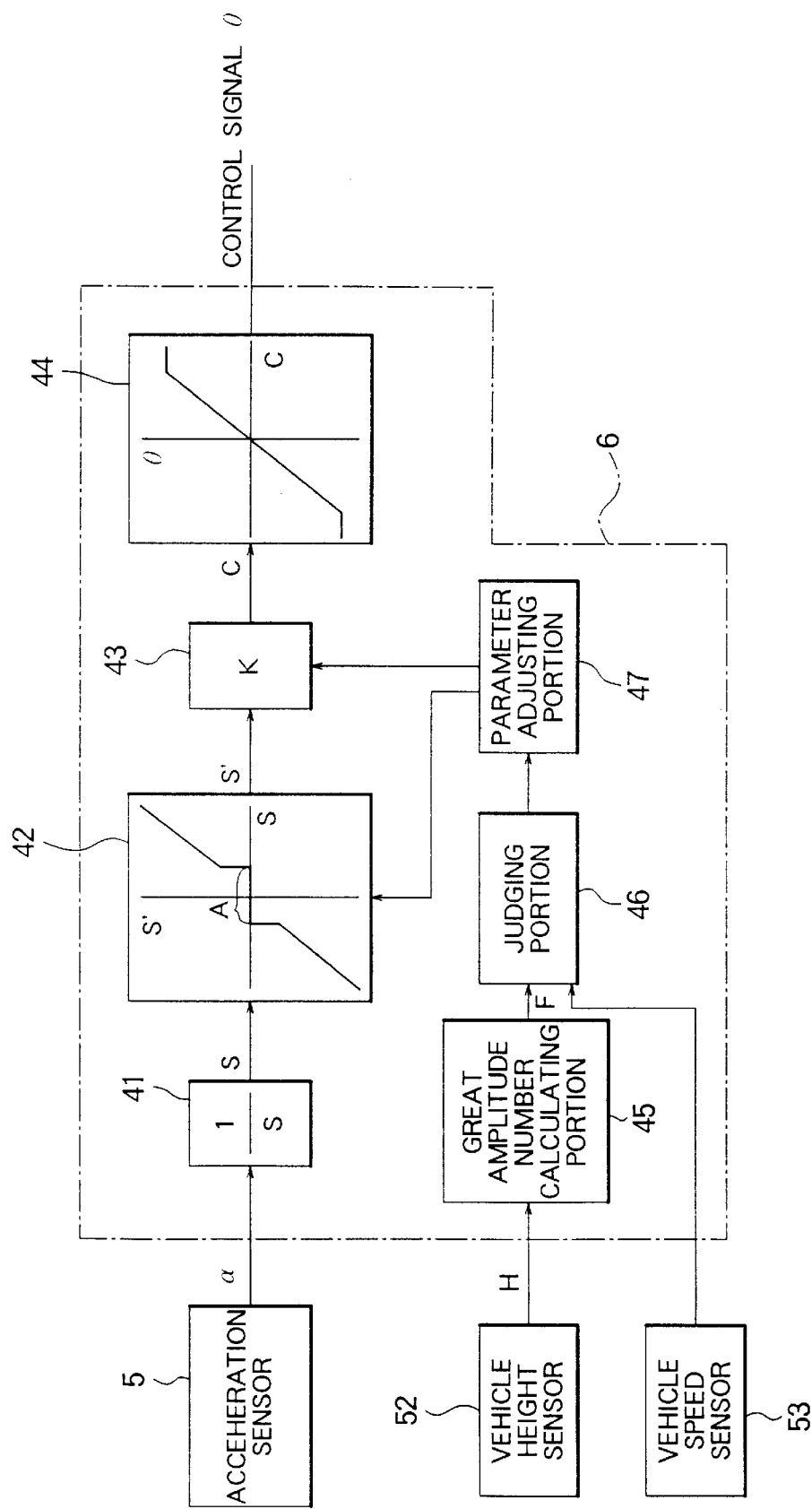
FIG. 24 is a block diagram showing an alteration of the controller of FIG. 16.
Figure 25:
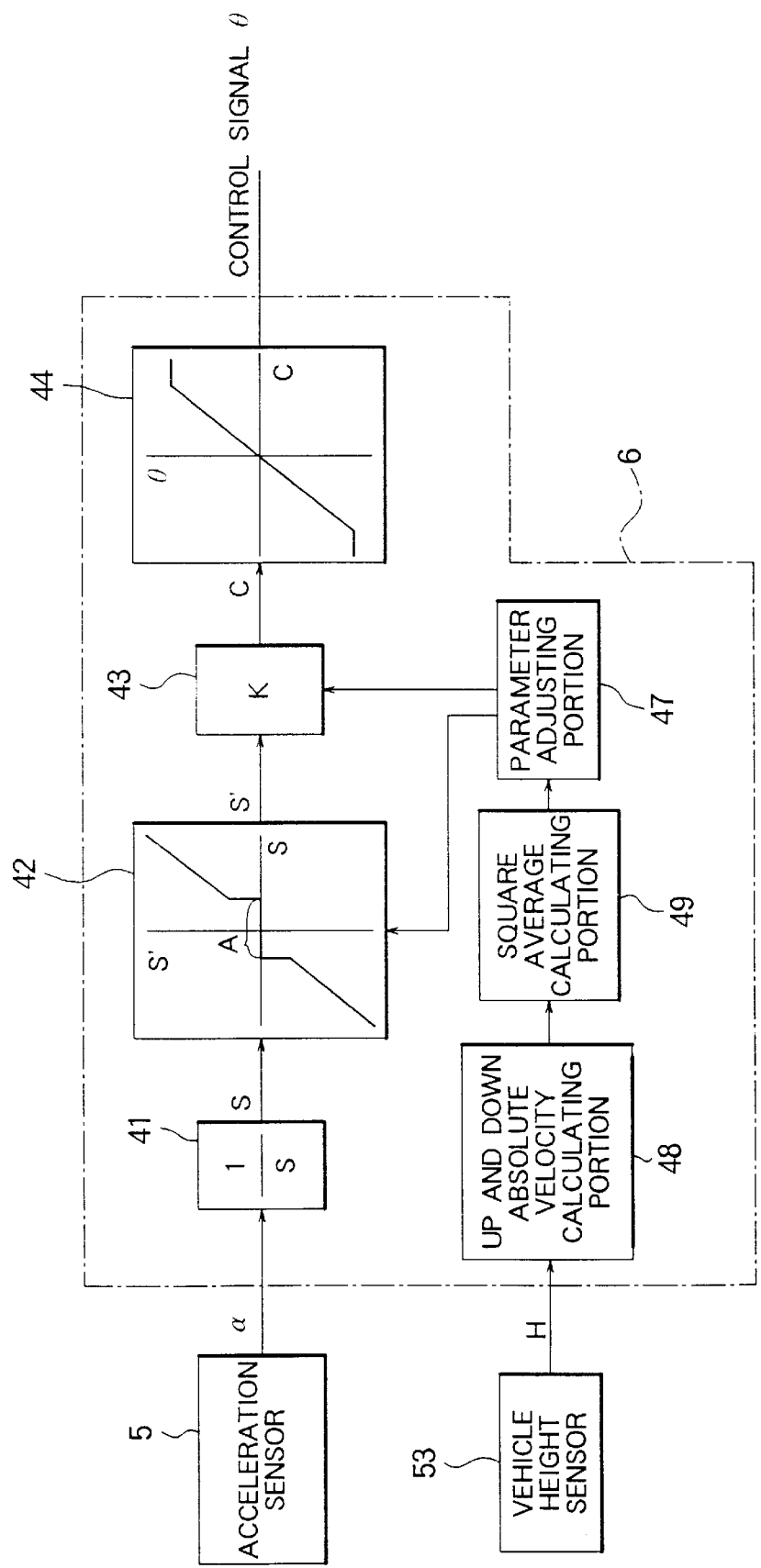
FIG. 25 is a block diagram of a controller according to a sixth embodiment.
Figure 26:
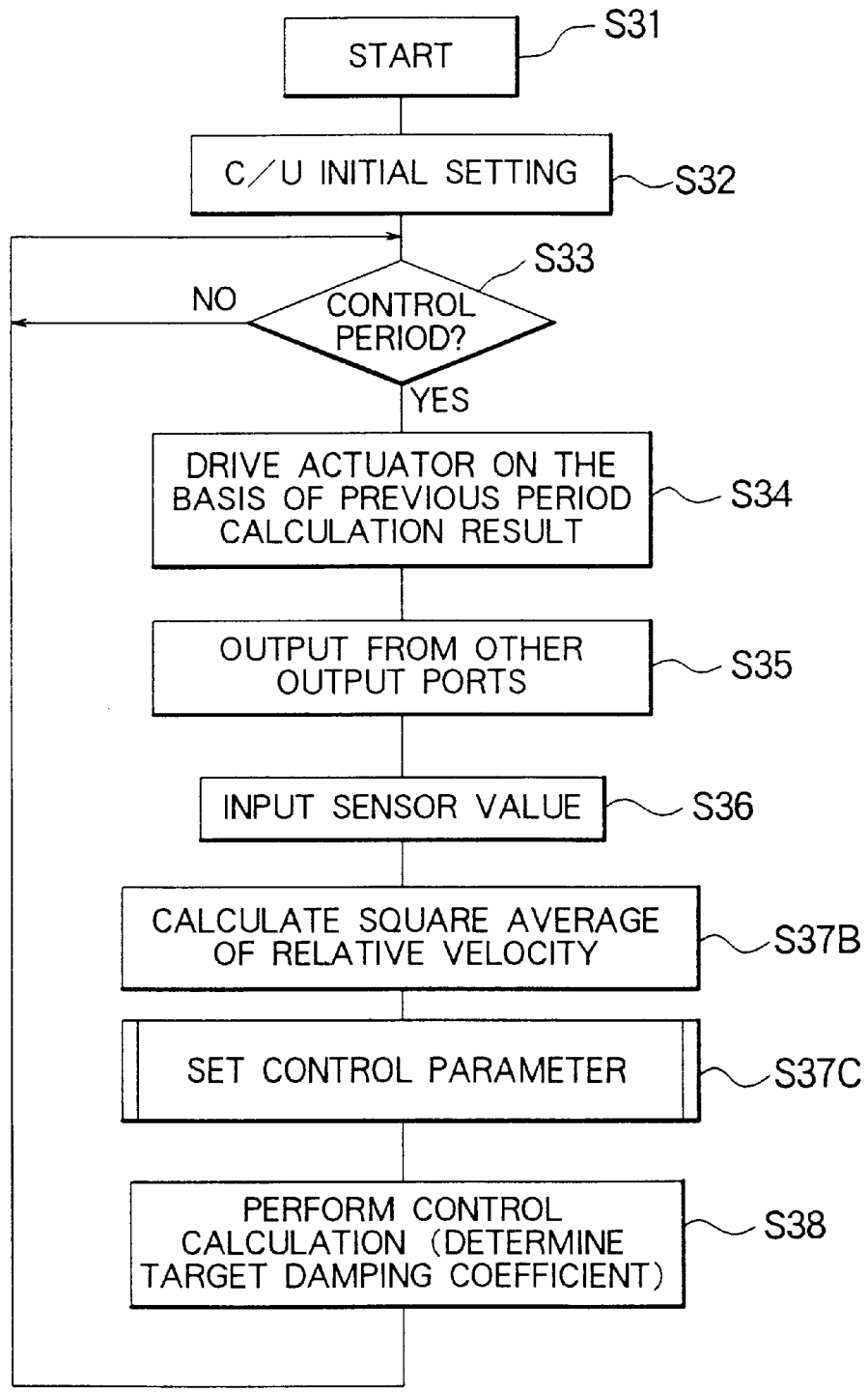
FIG. 26 is a flow chart showing control contents of the controller of FIG. 25.

Incidentally, in the fifth embodiment, while an example that the acceleration signal α from the acceleration sensor 5 is inputted to the great amplitude number calculating portion 45 was explained, in place of this example, a vertical velocity signal obtained by integrating the vertical acceleration signal as shown in FIG. 10 may be used. It is also possible that a vehicle height sensor 52 is provided as shown in FIG. 24 and a vehicle height signal H from the vehicle height sensor 52 may be sent to the great amplitude number calculating portion 45.

Figure 27:
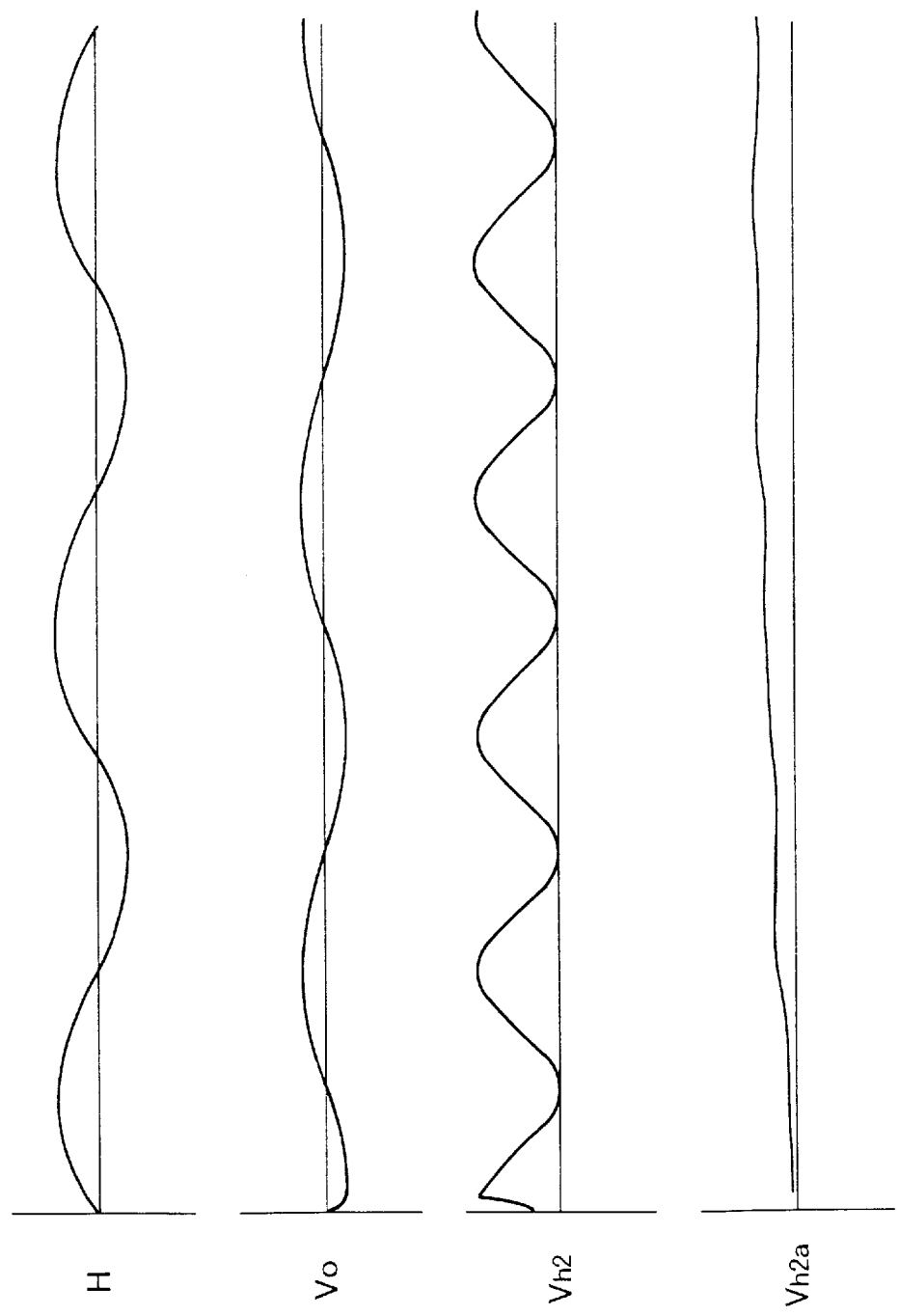
FIG. 27 is a graph showing various signal wave shapes when a road surface is not rough, in the sixth embodiment.
Figure 28:
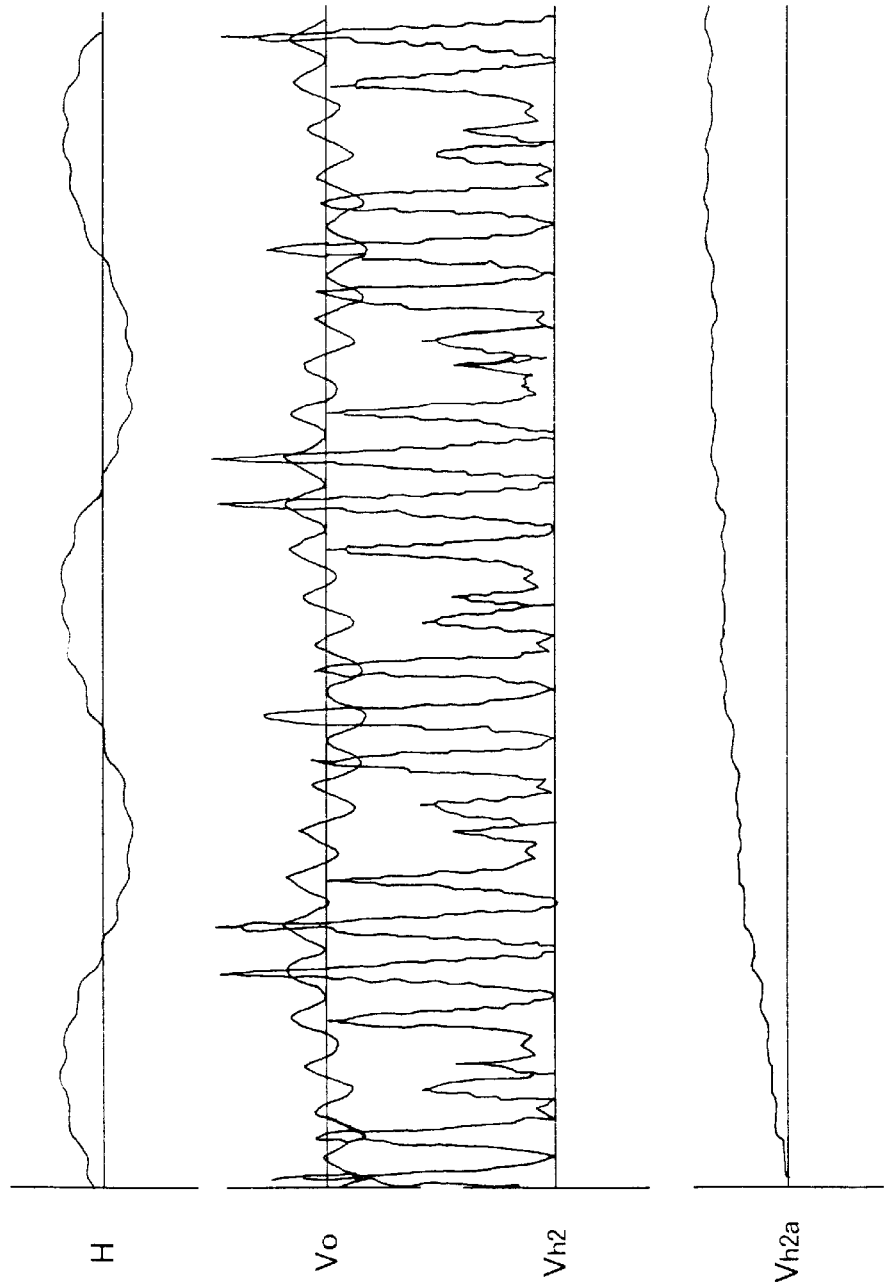
FIG. 28 is a graph showing various signal wave shapes when a road surface is slightly rough, in the sixth embodiment.
Figure 29:
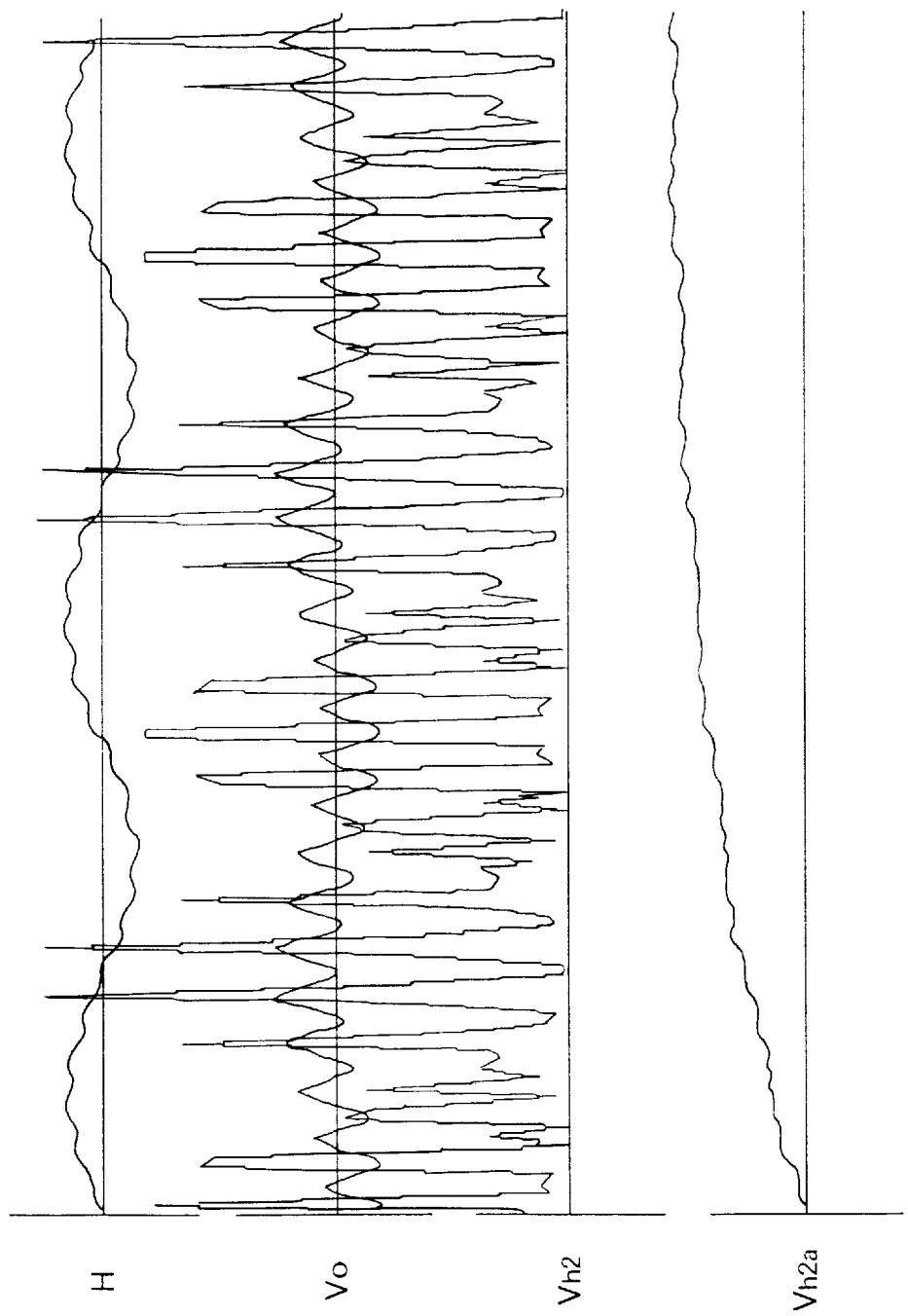
FIG. 29 is a graph showing various signal wave shapes when a road surface is rough, in the sixth embodiment.
Figure 30:
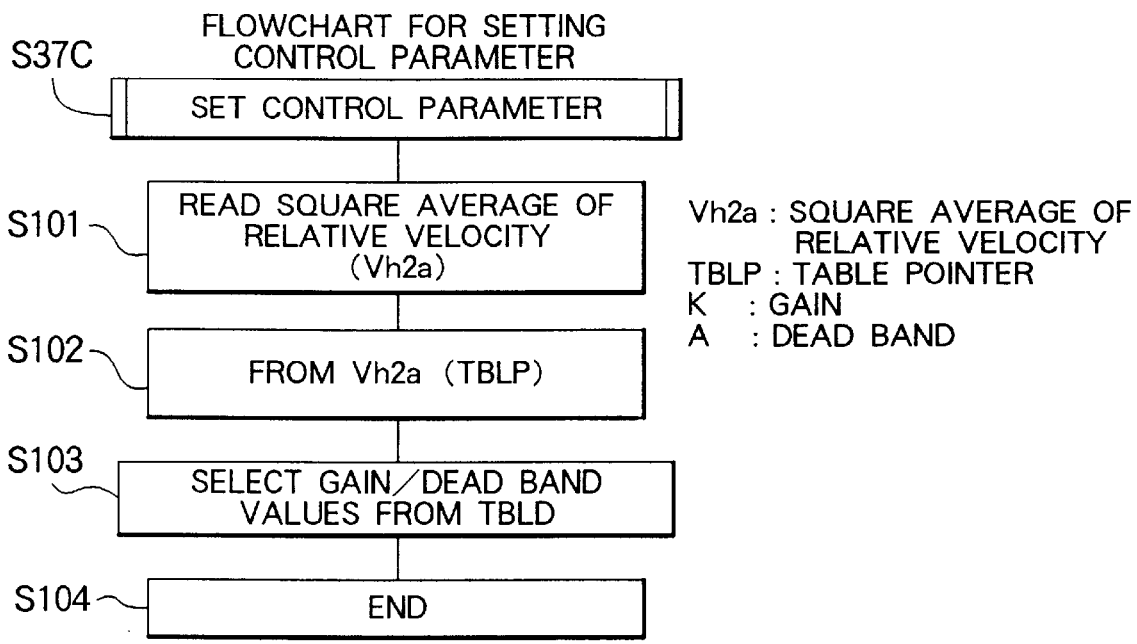
FIG. 30 is a flow chart of a control parameter setting sub-routine in the flow chart of FIG. 26.

Next, a sixth embodiment of the present invention will be explained with reference to FIGS. 25 to 31. Since the sixth embodiment is the same as the first embodiment regarding the elements and portions shown in FIGS. 1 to 4, explanation of these elements and portions will be omitted. Further, in these figures, the same elements and portions as those of the first embodiment are designated by the same reference numerals, and explanation thereof will be omitted. In this sixth embodiment, a vehicle height sensor 52 attached to the vehicle body 1 serves to detect a vehicle height data which is in turn sent to an upward and downward relative velocity calculating portion 48 of the controller 6. The vehicle height sensor 52 and the upward and downward relative velocity calculating portion 48 constitute an upward and downward relative velocity detecting means. For example, when the vehicle is running on a road surface which is not rough, a vehicle height signal H as shown in FIG. 27 is emitted. On the other hand, when the vehicle is running on a road surface which is slightly rough, a vehicle height signal H as shown in FIG. 28 is emitted, and, when the vehicle is running on a road surface which is rough, a vehicle height signal H as shown in FIG. 29 is emitted.

The controller 6 generally comprises an integration treatment portion 41, a correction value calculating portion 42, a control target value calculating portion 43, a control signal generating portion 44, the above-mentioned upward and downward relative velocity calculating portion 48, a square average calculating portion 49, and a parameter adjusting portion 47. The upward and downward relative velocity calculating portion 48 calculates an upward and downward relative velocity $v_0$ (FIGS. 27 to 29) by differentiating a vehicle height signal H from the vehicle height sensor 52 to obtain an upward and downward relative velocity signal, which is in turn outputted to the square average calculating portion 49. The square average calculating portion 49 calculates a square value $v_{h2}$ on the basis of the upward and downward relative velocity signal and stores the calculated square value for a predetermined time period (500 msec–10 sec), and further determines a square average value $v_{h2a}$ of the relative speed within the latest predetermined time period stored in the portion 49 on the basis of the square value $v_{h2}$, which square average value is in turn sent to the parameter adjusting portion 47. The sensitivity can be changed in accordance with the duration of the predetermined time period. As apparent from the comparison between FIGS. 27, 28 and 29, the more rough the road surface is, the greater the square average value $v_{h2a}$ of the relative velocity becomes.

The parameter adjusting portion 47 adjusts the control gain K/dead band A on the basis of the above-mentioned relation between the square average value $v_{h2a}$ of the relative velocity and the road surface condition. A table for the control gains K and the dead bands A is stored in the parameter adjusting portion 47. An example of the stored control gain is shown in the following Table 5, and an example of the stored dead band is shown in the following Table 6. The control gain K/dead band A are selected by a table pointer in such a manner that the control gain K becomes smaller and the dead band A becomes greater as the road surface becomes worse in this order:
(not rough→slightly rough→rough).

TABLE 5

| | control gain table | | | | | | |
|---|---|---|---|---|---|---|---|
| TBLP | 0 | 1 | 2 | 3 | 4 | ... | ... |
| K | 1.0 | 0.9 | 0.8 | 0.7 | 0.6 | ... | ... |

TABLE 6

| | dead band table | | | | | | |
|---|---|---|---|---|---|---|---|
| TBLP | 0 | 1 | 2 | 3 | 4 | ... | ... |
| A | 0.05 | 0.08 | 0.1 | 0.11 | 0.13 | ... | ... |

Figure 31:
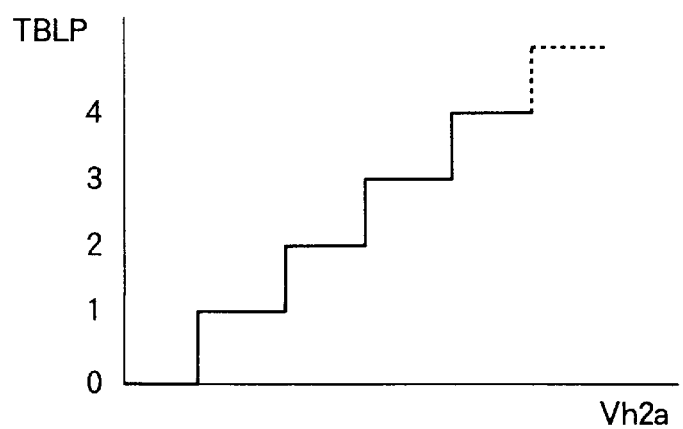
FIG. 31 is a graph showing the relationship between the square average of the upward and downward relative velocity and the table pointer.

The controller 6 performs treatments shown in steps S37B and S37C (FIG. 26) in place of the step S37 of FIG. 6 (first embodiment) in order to set the control gain K/dead band A. In the step S37B, the square average value $v_{h2a}$ of the relative velocity is determined; whereas, in the step S37C, the judgement of the road surface condition (setting of control parameter) is effected on the basis of the square average value $v_{h2a}$ of the relative velocity. Now, the sub-routine in the step S37C will be explained referring to FIG. 30. First of all, the square average value $v_{h2a}$ of the upward and downward relative velocity $v_0$ obtained in step S37B is calculated (step S101). The table pointer is made based on this square average value $v_{h2a}$ of the upward and downward relative velocity $v_0$ (step S102). The relationship between the square average value $v_{h2a}$ of the upward and downward relative velocity $v_0$ and the table pointer TBLP is shown in FIG. 31. As shown in this Figure, the greater the square average value $v_{h2a}$ becomes, the greater the table pointer TBLP becomes. The control gain K/dead band A corresponding to the table pointer TBLP are selected from the stored information (step S103). In this way, this sub-routine is completed (step S104), and the program is returned to the step S38 (FIG. 26) of the main routine.

In the sixth embodiment, the different control gain K/dead band A are set in accordance with the road surface condition. Thus, the up/down vibration can be suppressed in accordance with the road surface condition, thereby improving the riding comfort of the vehicle. In the first embodiment, while an example that the good road or bad road can be judged and two kinds of controls can be effected was explained, in the sixth embodiment, the multi-stage settings can be effected so that the control is performed with higher accuracy, thereby achieving excellent riding comfort of the vehicle.

Figure 32:
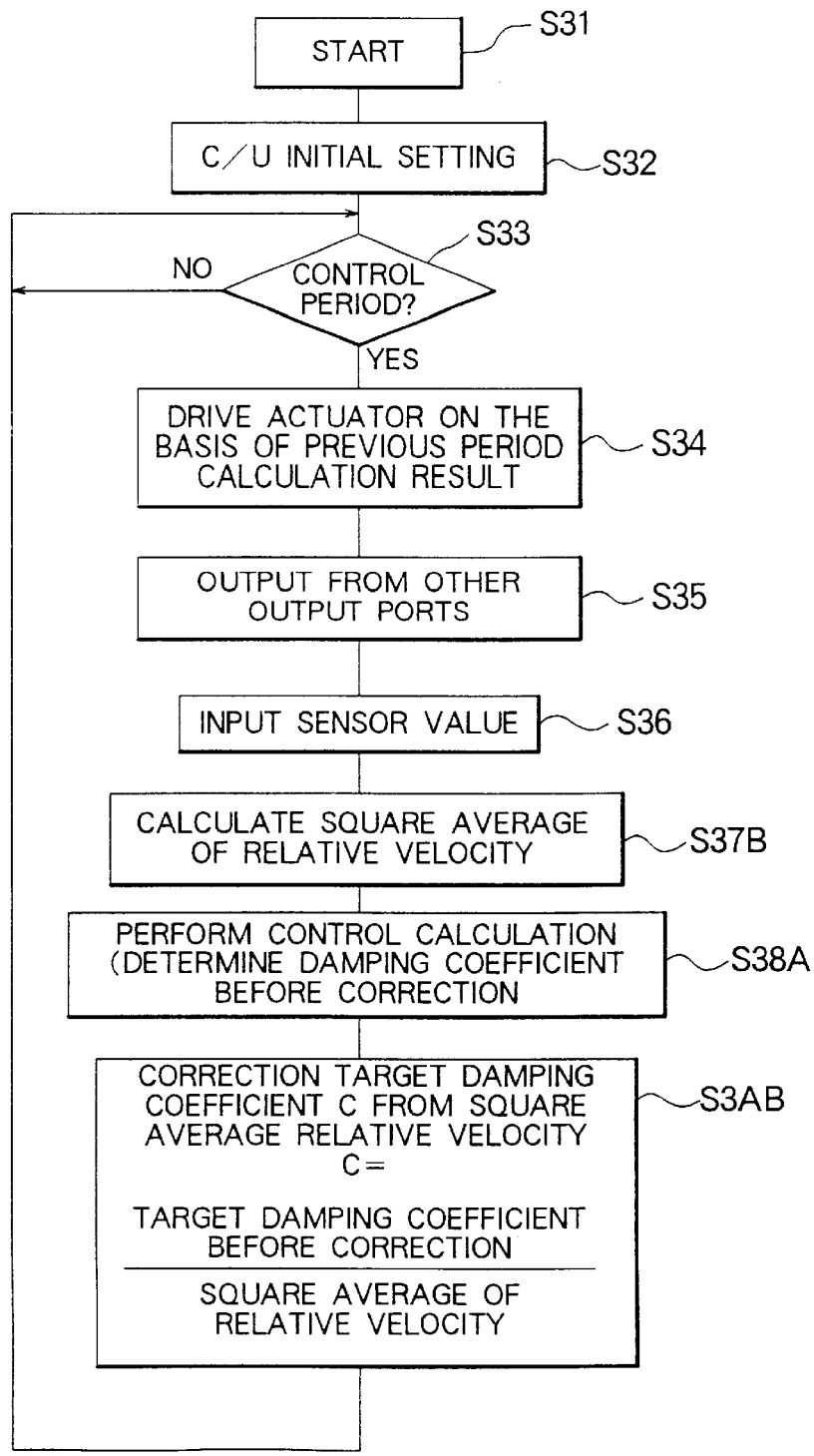
FIG. 32 is a flow chart showing control contents of an alteration of the controller of FIG. 25.

In the sixth embodiment, while an example that after the square average value of the relative velocity $v_0$ is calculated the program goes to the step S37C was explained, as shown in FIG. 32, the treatments in steps S38A and S38B may be effected instead of the steps S37C and S38.

In the step S38A, a pre-correction target damping coefficient is temporarily determined on the basis of the upward and downward relative velocity $v_0$. In the step S38B, the calculation of the following equation (1) is effected by using the square average value $v_{h2a}$ of the upward and downward relative velocity $v_0$ obtained in the step S37B regarding the pre-correction target damping coefficient, thereby determining the desired corrected damping coefficient C. By achieving calculation of equation (1), the correction is effected especially efficiently when the road is rough and, therefore, the energy of the unsprung mass is great (the square average value $v_{h2a}$ being large in this condition).

$$\text{desired damping coefficient } C = \quad (1)$$
$$\text{(pre-correction target damping coefficient)} \div$$
$$\text{(square average value of the upward and downward relative velocity)}$$

As mentioned above, according to the suspension control apparatus of the present invention having the above-mentioned construction, since the control gain becomes smaller and the predetermined value of the dead band becomes greater if the road surface condition is such as to be judged bad, even when the piston speed is increased during the vehicle running on the bad road surface, the damping force can be prevented from becoming too great, thereby preventing the vibration from being transmitted to the vehicle body and preventing the riding comfort of the vehicle from worsening.

What is claimed is:

1. A suspension control apparatus comprising:
   a shock absorber having a variable damping coefficient and disposed between a sprung mass and an unsprung mass of a vehicle;
   an actuator for setting and adjusting the variable damping coefficient of said shock absorber on the basis of a control signal;
   an acceleration sensor for detecting an upward acceleration and a downward acceleration of said vehicle and for outputting a corresponding upward and downward acceleration signal; and
   processing means, operatively coupled to said actuator and said acceleration sensor, for (a) detecting an upward absolute velocity and a downward absolute velocity of the vehicle based on the upward and downward acceleration signal from said acceleration sensor, (b) changing the detected upward absolute velocity and downward absolute velocity in accordance with a control parameter to obtain a control target, (c) generating the control signal for said actuator on the basis of said control target, (d) judging a roughness of a road surface on which the vehicle is running, and (e) adjusting said control parameter used to obtain the control target on the basis of the judged roughness of the road surface;
   wherein said processing means judges the roughness of the road surface by counting the number of times an amplitude of said upward and downward acceleration signal from said acceleration sensor exceeds a predetermined amplitude threshold value within a predetermined time period to obtain an amplitude change count number, and by judging that the road surface is rough when the amplitude change count number exceeds a predetermined number reference value.

2. A suspension control apparatus according to claim 1, wherein said processing means multiplies the upward absolute velocity and the downward absolute velocity by a control gain to obtain the control target, and adjusts the control gain on the basis of the judged surface roughness.

3. A suspension control apparatus according to claim 1, said processing means corrects the upward absolute velocity and downward absolute velocity to a correction value by treating a range of the upward absolute velocity and downward absolute velocity as a dead band when the upward absolute velocity and downward absolute velocity is smaller than a predetermined value, and adjusts a width of said dead band on the basis of the judged surface roughness.

4. A suspension control apparatus according to claim 1, further comprising a vehicle speed detector for detecting a vehicle speed, and wherein said processing means increases said number reference value in response to an increase in the vehicle speed detected by said vehicle speed detector.

5. A suspension control apparatus according to claim 1, further comprising a vehicle speed detector for detecting a vehicle speed, and wherein said processing means increases said amplitude threshold value in response to an increase in the vehicle speed detected by said vehicle speed detector.

6. A suspension control apparatus comprising:
   a shock absorber having a variable damping coefficient and disposed between a sprung mass and an unsprung mass of a vehicle;
   an actuator for setting and adjusting the variable damping coefficient of said shock absorber on the basis of a control signal;
   an acceleration sensor for detecting an upward acceleration and a downward acceleration of the vehicle and for outputting a corresponding upward and downward acceleration signal; and,
   processing means, operatively coupled to said actuator and said acceleration sensor, for (a) detecting an upward absolute velocity and a downward absolute velocity of the vehicle based on the upward and downward acceleration signal from said acceleration sensor, (b) multiplying the detected upward absolute velocity and downward absolute velocity by a control gain to obtain a control target, (c) generating the control signal for said actuator on the basis of said control target, (d) judging a roughness of a road surface on which the vehicle is running, and (e) adjusting said control gain to a smaller value when it is judged that the road surface is rough;
   wherein said processing means judges the roughness of the road surface by counting the number of times an amplitude of said upward and downward acceleration signal from said acceleration sensor exceeds a predetermined amplitude threshold value within a predetermined time period to obtain an amplitude change count number, and a by judging that the road surface is rough when the amplitude change count number exceeds a predetermined number reference value.

7. A suspension control apparatus according to claim 6, further comprising a vehicle speed detector for detecting a vehicle speed, and wherein said processing means increases said number reference value in response to an increase in the vehicle speed detected by said vehicle speed detector.

8. A suspension control apparatus according to claim 6, further comprising a vehicle speed detector for detecting a vehicle speed, and wherein said processing means increases said amplitude threshold value in response to an increase in the vehicle speed detected by said vehicle speed detector.

9. A suspension control apparatus comprising:
   a shock absorber having a variable damping coefficient and disposed between a sprung mass and an unsprung mass of a vehicle;
   an actuator for setting and adjusting the variable damping coefficient of said shock absorber on the basis of a control signal;
   an acceleration sensor for detecting an upward acceleration and a downward acceleration of the vehicle and for outputting a corresponding upward and downward acceleration signal; and processing means, operatively coupled to said actuator and said acceleration sensor, for (a) detecting an upward absolute velocity and a downward absolute velocity of the vehicle based on the upward and downward acceleration signal from said acceleration sensor, (b) correcting the detected upward absolute velocity and downward absolute velocity to a corrected value by treating a range of the upward and downward absolute velocity as a dead band when an absolute value thereof is smaller than a predetermined value, (c) multiplying the corrected value by a control gain to obtain a control target, (d) generating the control signal for said actuator on the basis of said control target, (e) judging whether a road surface on which the vehicle is running is rough, and (f) adjusting the predetermined value to a greater value when it is judged that the road surface is rough;

wherein said processing means judges the roughness of the road surface by counting the number of times an amplitude of said upward and downward acceleration signal from said acceleration sensor exceeds a predetermined amplitude threshold value within a predetermined time period to obtain an amplitude change count number, and a by judging that the road surface is rough when the amplitude change count number exceeds a predetermined number reference value.

10. A suspension control apparatus according to claim 9, further comprising a vehicle speed detector for detecting a vehicle speed, and wherein said processing means increases said number reference value in response to an increase in the vehicle speed detected by said vehicle speed detector.

11. A suspension control apparatus according to claim 9, further comprising a vehicle speed detector for detecting a vehicle speed, and wherein said processing means increases said amplitude threshold value in response to an increase in the vehicle speed detected by said vehicle speed detector.

12. A suspension control apparatus comprising:

a shock absorber having a variable damping coefficient and disposed between a sprung mass and an unsprung mass of a vehicle;

an actuator for setting and adjusting the variable damping coefficient of said shock absorber on the basis of a control signal;

an upward and downward acceleration sensor for detecting an upward acceleration and a downward acceleration of the vehicle and for outputting a corresponding upward and downward acceleration signal; and processing means, operatively coupled to said actuator and said acceleration sensor, for (a) detecting an upward absolute velocity and a downward absolute velocity of the vehicle based on the upward and downward acceleration signal from said acceleration sensor, (b) changing the detected upward absolute velocity and downward absolute velocity in accordance with a control parameter to obtain a control target, (c) generating the control signal for said actuator on the basis of said control target, (d) judging a roughness of a road surface on which the vehicle is running, and (e) adjusting a feature of said control parameter used to obtain the control target on the basis of the judged roughness of the road surface;

wherein said processing means obtains the upward and downward absolute velocities by integrating the upward and downward acceleration signal, and wherein said processing means judges the roughness of the road surface by counting the number of times an amplitude of said the upward and downward absolute velocities exceeds a predetermined amplitude threshold value within a predetermined time period to obtain an amplitude change count number, and by judging that the road surface is rough when the amplitude change count number exceeds a predetermined number reference value.

13. A suspension control apparatus according to claim 12, wherein said processing means multiplies the upward absolute velocity and the downward absolute velocity by a control gain to obtain the control target, and adjusts the control gain on the basis of the judged surface roughness.

14. A suspension control apparatus according to claim 12, said processing means corrects the upward absolute velocity and downward absolute velocity to a correction value by treating a range of the upward absolute velocity and downward absolute velocity as a dead band when the upward absolute velocity and downward absolute velocity is smaller than a predetermined value, and adjusts a width of said dead band on the basis of the judged surface roughness.

15. A suspension control apparatus according to claim 12, further comprising a vehicle speed detector for detecting a vehicle speed, and wherein said processing means increases said number reference value in response to an increase in the vehicle speed detected by said vehicle speed detector.

16. A suspension control apparatus according to claim 12, further comprising a vehicle speed detector for detecting a vehicle speed, and wherein said processing means increases said amplitude threshold value in response to an increase in the vehicle speed detected by said vehicle speed detector.

17. A suspension control apparatus comprising:

a shock absorber having a variable damping coefficient and disposed between a sprung mass and an unsprung mass of a vehicle;

an actuator for setting and adjusting the variable damping coefficient of said shock absorber on the basis of a control signal;

an acceleration sensor for detecting an upward acceleration and a downward acceleration of the vehicle and for outputting a corresponding upward and downward acceleration signal; and, processing means, operatively coupled to said actuator and said acceleration sensor, for (a) detecting an upward absolute velocity and a downward absolute velocity of the vehicle based on the upward and downward acceleration signal from said acceleration sensor, (b) multiplying the detected upward absolute velocity and downward absolute velocity by a control gain to obtain a control target, (c) generating the control signal for said actuator on the basis of said control target, (d) judging a roughness of a road surface on which the vehicle is running, and (e) adjusting said control gain to a smaller value when it is judged that the road surface is rough;

wherein said processing means obtains the upward and downward absolute velocities by integrating the upward and downward acceleration signal, and wherein said processing means judges the roughness of the road surface by counting the number of times an amplitude of said the upward and downward absolute velocities exceeds a predetermined amplitude threshold value within a predetermined time period to obtain an amplitude change count number, and by judging that the road surface is rough when the amplitude change count number exceeds a predetermined number reference value.

18. A suspension control apparatus according to claim 17, further comprising a vehicle speed detector for detecting a vehicle speed, and wherein said processing means increases said number reference value in response to an increase in the vehicle speed detected by said vehicle speed detector.

19. A suspension control apparatus according to claim 17, further comprising a vehicle speed detector for detecting a vehicle speed, and wherein said processing means increases said amplitude threshold value in response to an increase in the vehicle speed detected by said vehicle speed detector.

20. A suspension control apparatus comprising:
   a shock absorber having a variable damping coefficient and disposed between a sprung mass and an unsprung mass of a vehicle;
   an actuator for setting and adjusting the variable damping coefficient of said shock absorber on the basis of a control signal;
   an upward and downward acceleration sensor for detecting an upward acceleration and a downward acceleration of the vehicle and for outputting a corresponding upward and downward acceleration signal; and
   processing means, operatively coupled to said actuator and said acceleration sensor, for (a) detecting an upward absolute velocity and a downward absolute velocity of the vehicle based on the upward and downward acceleration signal from said acceleration sensor, (b) correcting the detected upward absolute velocity and downward absolute velocity to a corrected value by treating a range of the upward and downward absolute velocity as a dead band when an absolute value thereof is smaller than a predetermined value, (c) multiplying the corrected value by a control gain to obtain a control target, (d) generating the control signal for said actuator on the basis of said control target, (e) judging whether a road surface on which the vehicle is running is rough, and (f) adjusting the predetermined value to a greater value when it is judged that the road surface is rough;
   wherein said processing means obtains the upward and downward absolute velocities by integrating the upward and downward acceleration signal, and wherein said processing means judges the roughness of the road surface by counting the number of times an amplitude of said the upward and downward absolute velocities exceeds a predetermined amplitude threshold value within a predetermined time period to obtain an amplitude change count number, and by judging that the road surface is rough when the amplitude change count number exceeds a predetermined number reference value.

21. A suspension control apparatus according to claim 20, further comprising a vehicle speed detector for detecting a vehicle speed, and wherein said processing means increases said number reference value in response to an increase in the vehicle speed detected by said vehicle speed detector.

22. A suspension control apparatus according to claim 20, further comprising a vehicle speed detector for detecting a vehicle speed, and wherein said processing means increases said amplitude threshold value in response to an increase in the vehicle speed detected by said vehicle speed detector.

* * * * *